US011898787B2

(12) United States Patent
Park et al.

(10) Patent No.: US 11,898,787 B2
(45) Date of Patent: Feb. 13, 2024

(54) REFRIGERATOR WITH AUTOMATIC DOOR OPENING AND CONTROLLING METHOD THEREOF

(71) Applicant: Samsung Electronics Co., Ltd., Suwon-si (KR)

(72) Inventors: Taecheol Park, Suwon-si (KR); Byoungmok Kim, Suwon-si (KR); Jonghyun Son, Suwon-si (KR); Jeonghyun Lee, Suwon-si (KR); Seokjun Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 17/225,576

(22) Filed: Apr. 8, 2021

(65) Prior Publication Data

US 2021/0396452 A1 Dec. 23, 2021

(30) Foreign Application Priority Data

Jun. 19, 2020 (KR) .......................... 10-2020-0075235

(51) Int. Cl.
*F25D 23/02* (2006.01)
*G01S 7/48* (2006.01)
*H05B 47/115* (2020.01)

(52) U.S. Cl.
CPC .......... *F25D 23/028* (2013.01); *G01S 7/4808* (2013.01); *H05B 47/115* (2020.01); *F25D 2700/04* (2013.01)

(58) Field of Classification Search
CPC ............. F25D 2700/04; F25D 2700/06; F25D 2323/021; E05F 15/73; E05F 15/611
See application file for complete search history.

(56) References Cited

U.S. PATENT DOCUMENTS

2015/0335175 A1* 11/2015 Choueifati ............ A47F 3/0408
62/89
2018/0038637 A1* 2/2018 Kim ....................... F21V 14/06
(Continued)

FOREIGN PATENT DOCUMENTS

CN        106546051 A        3/2017
CN        106885416 A        6/2017
(Continued)

OTHER PUBLICATIONS

International Search Report dated Jul. 22, 2021, issued in International Application No. PCT/KR2021/004485.
(Continued)

*Primary Examiner* — Lionel Nouketcha
(74) *Attorney, Agent, or Firm* — Jefferson IP Law, LLP

(57) ABSTRACT

A refrigerator is provided. The refrigerator includes a main body including a first door, a door opening device configured to open the first door, a first proximity sensor disposed adjacent to the first door, a first infrared sensor disposed on the first door, and at least one processor, wherein the at least one processor is configured to, based on detection data obtained by the first proximity sensor, control the door opening device to open the first door based on an external object approaching within a threshold distance from the refrigerator, and based on the external object being identified based on detection data obtained by the first infrared sensor while the first door is open, control the door opening device to stop opening of the first door.

20 Claims, 25 Drawing Sheets

(56) References Cited

U.S. PATENT DOCUMENTS

2019/0041994 A1     2/2019   Cho
2019/0086141 A1*   3/2019   Kim ..................... F25D 23/028

FOREIGN PATENT DOCUMENTS

| | | |
|---|---|---|
| CN | 110411111 A | 11/2019 |
| JP | 4301216 B2 | 7/2009 |
| JP | 2017-110832 A | 6/2017 |
| KR | 20-1995-0006952 U | 3/1995 |
| KR | 10-2003-0050367 A | 6/2003 |
| KR | 10-2014-0088371 A | 7/2014 |
| KR | 10-1495091 B1 | 2/2015 |
| KR | 10-1572229 B1 | 11/2015 |
| KR | 10-2017-0019772 A | 2/2017 |
| KR | 10-2017-0082009 A | 7/2017 |
| KR | 10-2017-0112735 A | 10/2017 |
| KR | 10-2018-0049674 A | 5/2018 |
| KR | 10-2011565 B1 | 8/2019 |
| KR | 10-2019-0115240 A | 10/2019 |
| KR | 10-2020-0007590 A | 1/2020 |
| WO | 2016/200050 A1 | 12/2016 |

OTHER PUBLICATIONS

European Search Report dated May 19, 2023; European Appln. No. 21824780.7-1016 / 4088071 PCT/KR2021004485.

* cited by examiner

REFRIGERATOR WITH AUTOMATIC DOOR OPENING AND CONTROLLING METHOD THEREOF

CROSS-REFERENCE TO RELATED APPLICATION(S)

This application is based on and claims priority under 35 U.S.C. § 119(a) of a Korean patent application number 10-2020-0075235, filed on Jun. 19, 2020, in the Korean Intellectual Property Office, the disclosure of which is incorporated by reference herein in its entirety.

BACKGROUND

1. Field

The disclosure relates to a refrigerator and a method for controlling thereof. More particularly, the disclosure relates to a refrigerator for controlling an automatic opening door operation using an infrared sensor, and a method for controlling thereof.

2. Description of the Related Art

A refrigerator door automatically opens according to a user command. The user command may be input to the refrigerator through voice recognition, a physical button, a sensor, or the like.

The refrigerator door may automatically open through a user motion corresponding to a user command.

However, when a plurality of doors are attached to the refrigerator, there is a problem in that it is difficult to identify which door the user intends to open automatically. More particularly, when there are a plurality of sensors, mutual interference may occur, and there is a problem that a door that the user did not intend to open opened.

In addition, while the user does not know the automatic door opening function of the refrigerator, when a preset event occurs and a door is automatically opened, the user may get hit by the door.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a refrigerator that detects an approach of an external object in the automatic door opening operation and controls the door to not be opened automatically, and a method for controlling thereof.

Additional aspects will be set forth in part in the description which follows and, in part, will be apparent from the description, or may be learned by practice of the presented embodiments.

In accordance with an aspect of the disclosure, a refrigerator is provided. The refrigerator includes a main body including a first door, a door opening device configured to open the first door, a first proximity sensor disposed adjacent to the first door, a first infrared sensor disposed on the first door, and at least one processor, wherein the at least one processor is configured to, based on detection data obtained by the first proximity sensor, control the door opening device to open the first door based on an external object approaching within a threshold distance from the refrigerator, and based on the external object being identified based on detection data obtained by the first infrared sensor while the first door is open, control the door opening device to stop opening of the first door.

In accordance with another aspect of the disclosure, a method for controlling a refrigerator including a main body including a first door, a door opening device configured to open the first door, a first proximity sensor disposed adjacent to the first door, and a first infrared sensor disposed on the first door is provided. The method includes based on detection data obtained by the first proximity sensor, controlling the door opening device to open the first door based on an external object approaching within a threshold distance from the refrigerator, and based on the external object being identified based on detection data obtained by the first infrared sensor while the first door is open, controlling the door opening device to stop opening of the first door.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
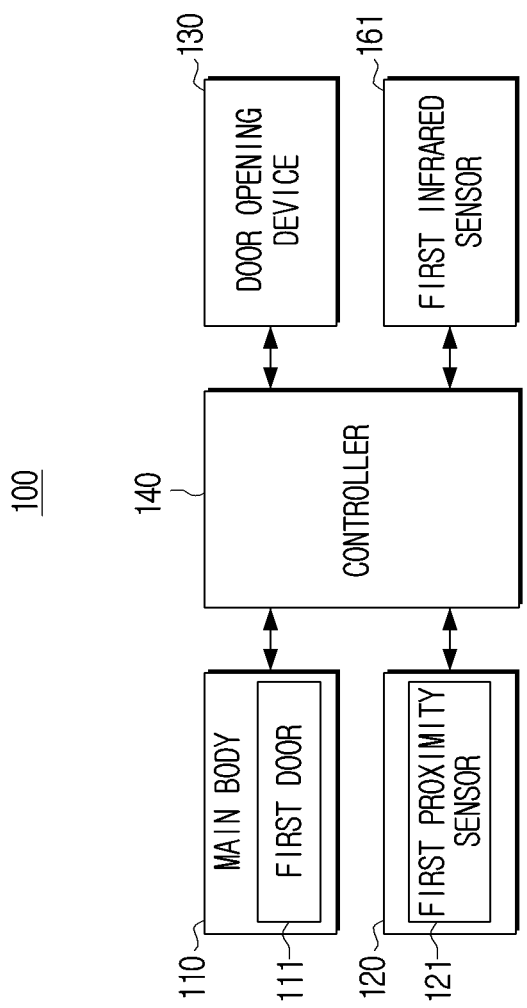
FIG. 1 is a block diagram illustrating a refrigerator according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have," "may have," "include," or "may include" or the like represent presence of a corresponding feature (for example, components, such as numbers, functions, operations, or parts) and does not exclude the presence of additional feature.

The expression "At least one of A or/and B" should be understood to represent "A" or "B" or any one of "A and B."

The expression "1", "2", "first", or "second" as used herein may modify a variety of elements, irrespective of order and/or importance thereof, and only to distinguish one element from another. Accordingly, without limiting the corresponding elements.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another intervening element (e.g., a third element).

The terms "include", "comprise", "is configured to," or the like, of the description are used to indicate that there are features, numbers, operations, elements, parts or combination thereof, and they should not exclude the possibilities of combination or addition of one or more features, numbers, operations, elements, parts or a combination thereof.

In the disclosure, a "module" or a "unit" performs at least one function or operation and may be implemented by hardware or software or a combination of the hardware and the software. In addition, a plurality of 'modules' or a plurality of "units" may be integrated into at least one module and may be at least one processor except for "modules" or "units" that should be realized in a specific hardware.

In addition, the term "user" may refer to a person who uses an electronic apparatus or an apparatus (e.g., an artificial intelligence (AI) electronic apparatus) that uses the electronic apparatus.

FIG. 1 is a block diagram of a refrigerator according to an embodiment of the disclosure.

Referring to FIG. 1, a refrigerator 100 may include a main body 110, a proximity sensor 120, a door opening device 130, a controller 140, and a first infrared sensor 161.

The refrigerator 100 may be a device to cool a cooled body by cooled air generated by passing through a compressor, a condenser, an expansion device, and an evaporator according to a cooling cycle for storage through refrigeration or freezing.

The main body 110 may include a first door 111.

The proximity sensor 120 is a sensor for detecting an object even without contact and may be used to detect presence of an object in the vicinity of the refrigerator 100. One or a plurality of proximity sensors 120 may be disposed on a front surface of at least one of the plurality of doors. The proximity sensor 120 may be implemented as, for example, an optical proximity sensor, a capacitive proximity sensor, an inductive proximity sensor, or the like. The proximity sensor 120 may be an infrared (IR) proximity sensor 120. The refrigerator 100 may detect the approach of an external object through a front camera or a microphone as well as the proximity sensor 120.

The proximity sensor 120 may include a first proximity sensor 121.

The door opening device 130 may be a module for automatically opening a plurality of doors attached to the main body of the refrigerator 100. The door opening device 130 may be included in a door opening/closing module, and the door opening/closing module may include the door opening device 130 and a door closing device (not shown). The door opening/closing module may automatically close the at least one door using the door opening device 130 or automatically close the at least one door using a door closing device (not shown).

The first infrared sensor 161 may refer to a sensor of a method for detecting a location of an object by outputting infrared rays and receiving infrared rays reflected by the object.

The controller 140 may perform overall control operations of the refrigerator 100. The controller 140 may function to control overall operations of the refrigerator 100.

The controller 140 may be implemented with at least one of a digital signal processor (DSP), a microprocessor, and a time controller (TCON), but is not limited thereto. The controller 140 may include at least one of a central processing unit (CPU), a micro controller unit (MCU), a micro processing unit, a controller, an application processor (AP), a graphics-processing unit (GPU), a communication processor (CP), and an advanced reduced instruction set computing (RISC) machine (ARM) processor or may be defined as a corresponding term. The controller 140 may be implemented in a system on chip (SoC) type or a large scale integration (LSI) type in which a processing algorithm is built therein or in a field programmable gate array (FPGA) type. The controller 140 may perform various functions by executing computer executable instructions stored in the memory.

The refrigerator 100, according to an embodiment of the disclosure, may include a main body including a first door 111, a door opening device 130 for opening the first door 111, the first proximity sensor 121 disposed adjacent to the first door 111, a first infrared sensor 161 disposed on the first door 111, and a controller 140.

The controller 140 may control the door opening device 130 to open the first door 111 when an external object approaches within a threshold distance from the refrigerator 100 based on a detection data (or sensing data) acquired by the first proximity sensor 121, and control, while the first door 111 is being opened, the door opening device 130 to stop opening the first door 111 when the external object is identified based on the detection data acquired by the first infrared sensor 161.

The controller 140 may acquire detection data through the first proximity sensor 121. Here, the detection data may refer to data indicating whether an external object is approached based on a detection direction of the first proximity sensor 121. The controller 140 may control the door opening device 130 to automatically open the first door 111 based on a preset event. The preset open event may vary according to user settings. As an example, the preset opening event may be that an external object approaches within a threshold distance from the refrigerator 100. As another example, the preset opening event may refer to an event in which an external object is detected within a first threshold distance, an external object is detected within a second threshold distance thereafter, and no external object is detected within a second threshold distance thereafter. A description will be described below in FIGS. 11 to 15.

The controller 140 may control the door opening device 130 to turn off the automatic door opening function such that the first door 111 does not automatically open based on a preset stop event. In order to reduce a risk of the user being injured by the automatic door opening function, the controller 140 may control the door opening device 130 such that the automatic door opening function is no longer performed when a preset event occurs by storing a preset stop event.

According to an embodiment of the disclosure, a time of occurrence of the preset stop event may be before a time of occurrence of the preset open event. In other words, when the preset stop event occurs irrespective of whether the preset open event occurs, the controller 140 may control the door opening device 130 such that the first door 111 is not opened.

According to another embodiment of the disclosure, the time when the preset stop event occurs may be after the time when the preset open event occurs. In other words, when the preset open event occurs and the immediately preset stop event occurs, the controller 140 may turn off the automatic door opening function. The turning off the automatic door opening function may be applied to various embodiments. For example, it may refer to controlling the door opening device 130 such that the door is no longer automatically opened in a preparation stage for automatic door opening. The preparation operation may refer to a state in which a control command instructing to automatically open the door is transmitted to the door opening device 130, but it may refer to a state the door is not actually opened, or may refer to a standby state waiting for a final command. As another example, it may refer to controlling the door opening device 130 such that the door is not automatically opened while the door is automatically opened.

When it is identified that the door is not completely closed through the door sensor 177 while the automatic door opening function is turned off, the controller 140 may control the door opening device 130 to automatically close the door.

In addition, the first door 111 may include a first cover 111-2 disposed outside the first door 111 and a first handle 111-1 formed inside the first cover 111-2. The first infrared sensor 161 may be disposed between the first cover 111-2 and the first handle 111-1.

The first cover 111-2 may refer to a member disposed on the outermost side of the first door 111. The first cover 111-2 may refer to a front cover. In addition, the first cover 111-2 may be expressed as an outer plate, an outer installation member, an outer cover, an outer frame, or the like. The first cover 111-2 may include a front cover and a bottom cover. For example, a front cover of the first door 111 may refer to an outer plate located at the front of the first door 111, and a bottom cover of the first door 111 may refer to an outer plate located on the bottom surface.

The inside of the first cover 111-2 may refer to an inner area of the first cover 111-2, and the first handle 111-1 may be disposed in a bottom area of the first cover 111-2.

Here, when the user holds the handle, the first infrared sensor 161 must be able to detect it, and the first infrared sensor 161 may be disposed between the first cover 111-2 and the first handle 111-1. When the first infrared sensor 161 is disposed between the first cover 111-2 and the first handle 111-1, the user may pass a hand in a detection direction of the first infrared sensor 161. A description will be described below in FIGS. 8 to 9A.

In addition, the first handle 111-1 may be disposed on a bottom surface (or cap door) of the first door 111, and the first infrared sensor 161 may be disposed on the bottom surface (or cap door) of the first door 111 and irradiate infrared rays downward from the first door 111.

The detection direction of the first infrared sensor 161 may be below the first door 111. Here, the detection direction of the first proximity sensor 121 may be in front of the first door 111. In other words, each sensor may be disposed such that the detection direction of the first infrared sensor 161 and the detection direction of the first proximity sensor 121 are vertical.

Meanwhile, the first door 111 may include a first light emitter 151 disposed adjacent to the first infrared sensor 161, and the controller 140 may control a first light emitter 151 based on a detection data obtained from the first proximity sensor 121.

The first light emitter 151 may be a unit including at least one light emitting element. The first light emitter 151 may irradiate light. The first light emitter 151 and the first infrared sensor 161 may be disposed on the bottom of the first door 111 and may be disposed adjacent to each other.

The detection data acquired by the first proximity sensor 121 may mean a result of detecting an external object on the front area of the first door 111.

In addition, the controller 140 may identify an approach distance of an external object based on the detection data obtained from the first proximity sensor 121, and change a light emitting mode of the first light emitter 151 based on the identified approach distance.

In addition, the controller 140 may identify access distance information of an external object based on detection data obtained from the first proximity sensor 121. In addition, when the approach distance information of the external object is within a first threshold distance, the controller 140 may control the first light emitter 151 to operate in the first light emitting mode. In addition, when the approach distance information is within a second threshold distance, the first light emitter 151 may be controlled to operate in the second light emitting mode.

For example, it is assumed that the first threshold distance is 60 cm and the second threshold distance is 30 cm. When the approach distance information of the external object is 50 cm, the controller 140 may control the first light emitter 151 to operate in the first light emitting mode. In addition, if the approach distance information of the external object is 20 cm, the controller 140 may control the first light emitter 151 in the second light emitting mode.

In addition, when the approach distance of the external object is within the first threshold distance, the controller 140 may turn on the first light emitter 151, and when the approach distance of the external object is within a second threshold smaller (or shorter) than the first threshold distance, the controller 140 may turn off the first light emitter 151.

According to an embodiment of the disclosure, the first light emitting mode may mean a mode in which the light emitting diode irradiates light with a constant illuminance, and the second light emitting mode may mean a mode in which the light emitting diode irradiates light.

According to another embodiment of the disclosure, the first emitting mode may be a mode in which light of a first color is irradiated, and a second mode may be a mode in which light of a second color different from the first color is irradiated.

Meanwhile, the first door 111 may include a first cover 111-2 disposed outside the first door 111 and a first handle 111-1 formed inside the cover. The first infrared sensor 161 may be disposed between the first cover 111-2 and the first handle 111-1, and the first infrared sensor 161 and the first light emitter 151 may be included in the first module disposed in parallel to the first handle 111-1.

Figure 9A:
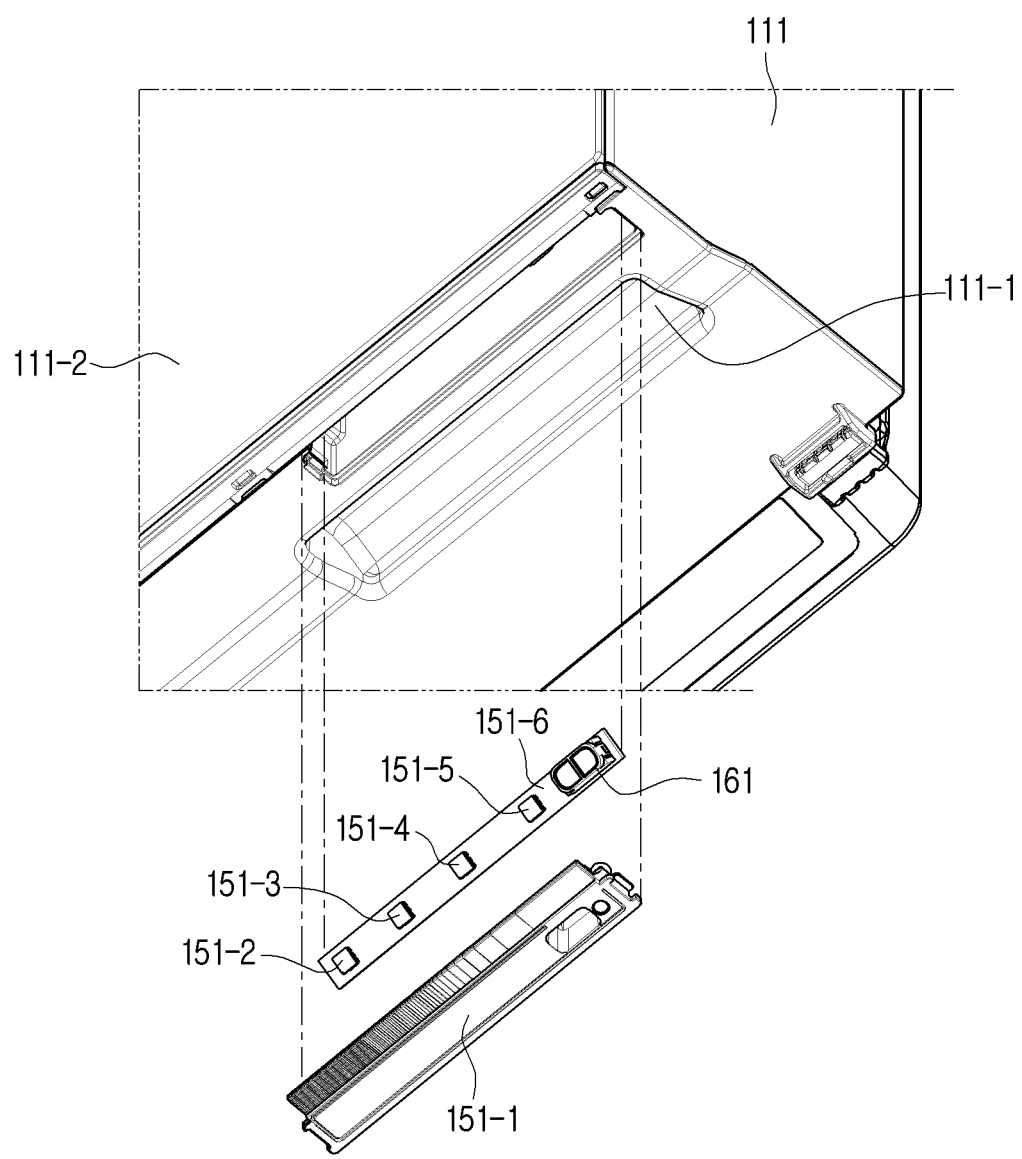
FIG. 9A is a perspective view illustrating a first door of FIG. 8 according to an embodiment of the disclosure.
Figure 10A:
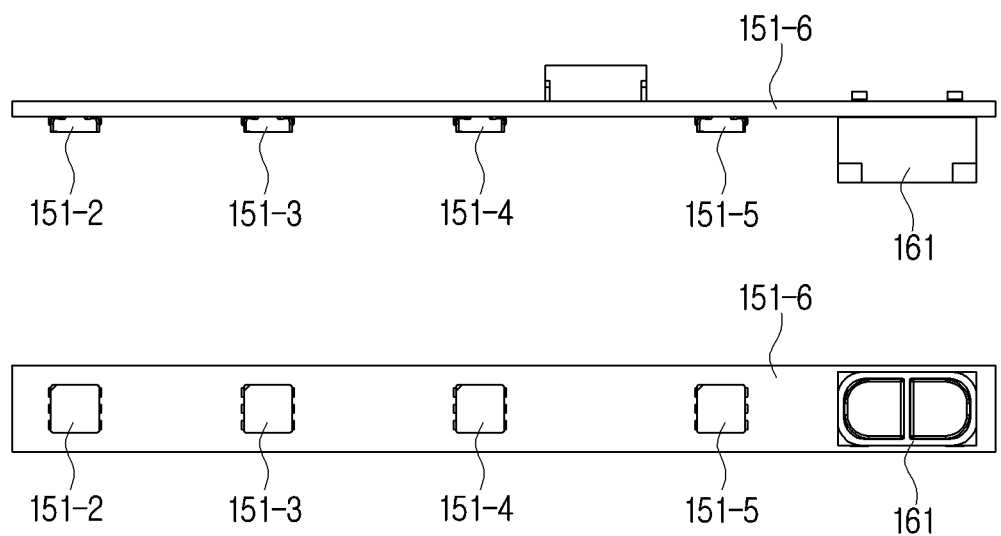
FIG. 10A is a bottom view and a front view illustrating a substrate on which a plurality of light emitting diodes and a first infrared sensor are disposed together according to an embodiment of the disclosure.

The first module disposed parallel to the first handle 111-1 may refer to a substrate 151-6 of FIGS. 9A and 10A. The first infrared sensor 161 and the first light emitter 151 may be disposed on the same substrate 151-6 to form one module.

Meanwhile, the refrigerator 100 may further include a second door 112 disposed adjacent to the first door 111 in a horizontal direction, a second proximity sensor 122 disposed adjacent to the second door 112, and a second infrared sensor 162 disposed on the second door 112. The controller 140 may, based on the detection data obtained from the first proximity sensor 121 and the second proximity sensor 122, identify a door close to an external object approaching within a threshold distance from the refrigerator 100, control the door opening device 130 to open the identified door among the first door 111 and the second door 112, and when an external object is identified by an infrared sensor disposed on the identified door while the identified door is being opened, control the door opening device 130 to stop opening of the identified door.

The second infrared sensor 162 may be disposed on the bottom of the second door 112. Specifically, the second door 112 may include a second cover (not shown) disposed outside the second door 112 and a second handle (not shown) formed inside the second cover. The second infrared sensor 162 may be disposed between the second cover and the second handle.

In addition, the controller 140 may compare detection data acquired by the first proximity sensor 121 and detection data acquired by the second proximity sensor 122. Since the first proximity sensor 121 and the second proximity sensor 122 operate alternately, an approach of an external object may not be identified at the same time. However, when a cycle of the alternating operation is shortened to a short time, both the first proximity sensor 121 and the second proximity sensor 122 may detect an external object. The controller 140 may identify whether the external object is closer to which of the first proximity sensor 121 or the second proximity sensor 122 is present. In addition, if it is identified that the external object is close to the first proximity sensor 121, the controller 140 may identify that the external object has approached the first door 111. In addition, if it is identified that the external object is close to the second proximity sensor 122, the controller 140 may identify that the external object has approached the second door 112.

In addition, the controller 140 may control the door opening device 130 to open at least one of the identified first door 111 and the second door 112 based on a preset open event. A description of the preset open event will be described below with reference to FIGS. 11 to 18.

Meanwhile, according to the embodiment of the disclosure, the controller 140 may control the door opening device 130 to open all of the first door 111 and second door 112 when it is identified that the external object is within a threshold distance from the first proximity sensor 121 and the second proximity sensor 122.

The controller 140 may control the door opening device 130 to stop opening of the identified door only when the external object is identified by an infrared sensor disposed on the identified door while the identified door is being opened.

As an example, when an external object is detected by the first infrared sensor 161 disposed on the first door 111 while the first door 111 is being opened, the controller 140 may control the first door 111 to stop opening of the first door 111.

As another example, when an external object is detected by the second infrared sensor 162 disposed on the second door 112 while the first door 111 is open, the controller 140 may maintain the operation of opening the first door 111.

As another example, when an external object is detected by the first infrared sensor 161 disposed on the first door 111 while the second door 112 is opening, the controller 140 may maintain the operation of opening the second door 112.

As another example, when an external object is detected by the second infrared sensor 162 disposed on the second door 112 while the second door 112 is open, the controller 140 may control the door opening device 130 to stop opening the second door 112.

The operation of stopping the opening of the door may refer to turning off the automatic door opening operation function, and may refer to transmitting a control command such that the door is not automatically opened.

In addition, the first door 111 may include a first cover 111-2 disposed outside the first door 111 and a first handle 111-1 formed inside the cover, and the second door 112 may include a second cover disposed outside the second door 112 and a second handle formed inside the cover, and the first infrared sensor 161 may be disposed between the first cover 111-2 and the first handle 111-1, and the second infrared sensor 162 may be disposed between the second cover and the second handle.

In addition, the first infrared sensor 161 disposed on the first door 111 may be disposed adjacent to the second door 112, and the second infrared sensor 162 disposed on the second door 112 may be disposed adjacent to the first door 111.

The first door 111 may be disposed adjacent to the second door 112 in a horizontal direction, and the first infrared sensor 161 may be disposed adjacent to the second infrared sensor 162 in a horizontal direction. However, here, when there is an empty space between the first door 111 and the second door 112, the space between the first infrared sensor 161 and the second infrared sensor 162 may be disposed.

Meanwhile, the refrigerator 100 according to an embodiment of the disclosure further includes a first infrared sensor 161 and a second infrared sensor 162 separately from the first proximity sensor 121 to a sixth proximity sensor 126 having a front detection direction. When the proximity sensors use the infrared method, the proximity sensor and the infrared sensor may be matched in an operation principle.

However, the detection direction of the proximity sensor may be toward the front of the refrigerator 100, and the detection direction of the infrared sensor may be related to a handle. When the handle is located on the bottom of the door, the detection direction of the infrared sensor may be below the refrigerator 100, and when the handle is located on the side of the door, the detection direction of the infrared sensor may be a side of the refrigerator 100.

Thus, the proximity sensor detection direction of the infrared sensor and the detection direction may be a right angle type.

Further, a detection range of the proximity sensor and a detection range of the infrared sensor may be different. The detection range of the proximity sensor may be greater than the detection range of the infrared sensor.

In addition, a detection target between the proximity sensor and the infrared sensor may be different. The detection data obtained from the proximity sensor may be used to identify whether an external object is approaching and an approach distance, and detection data obtained from the infrared sensor may be used to identify whether an external object is approaching. If the data acquired from the infrared sensor is used only to identify whether an external object is approaching or not, a processing speed may be improved, and a delay in a processing result and a processing operation is eliminated, thereby preventing a situation in which the user gets hit by the door. In other words, the refrigerator 100 may perform the stop opening of the door faster.

Figure 2:
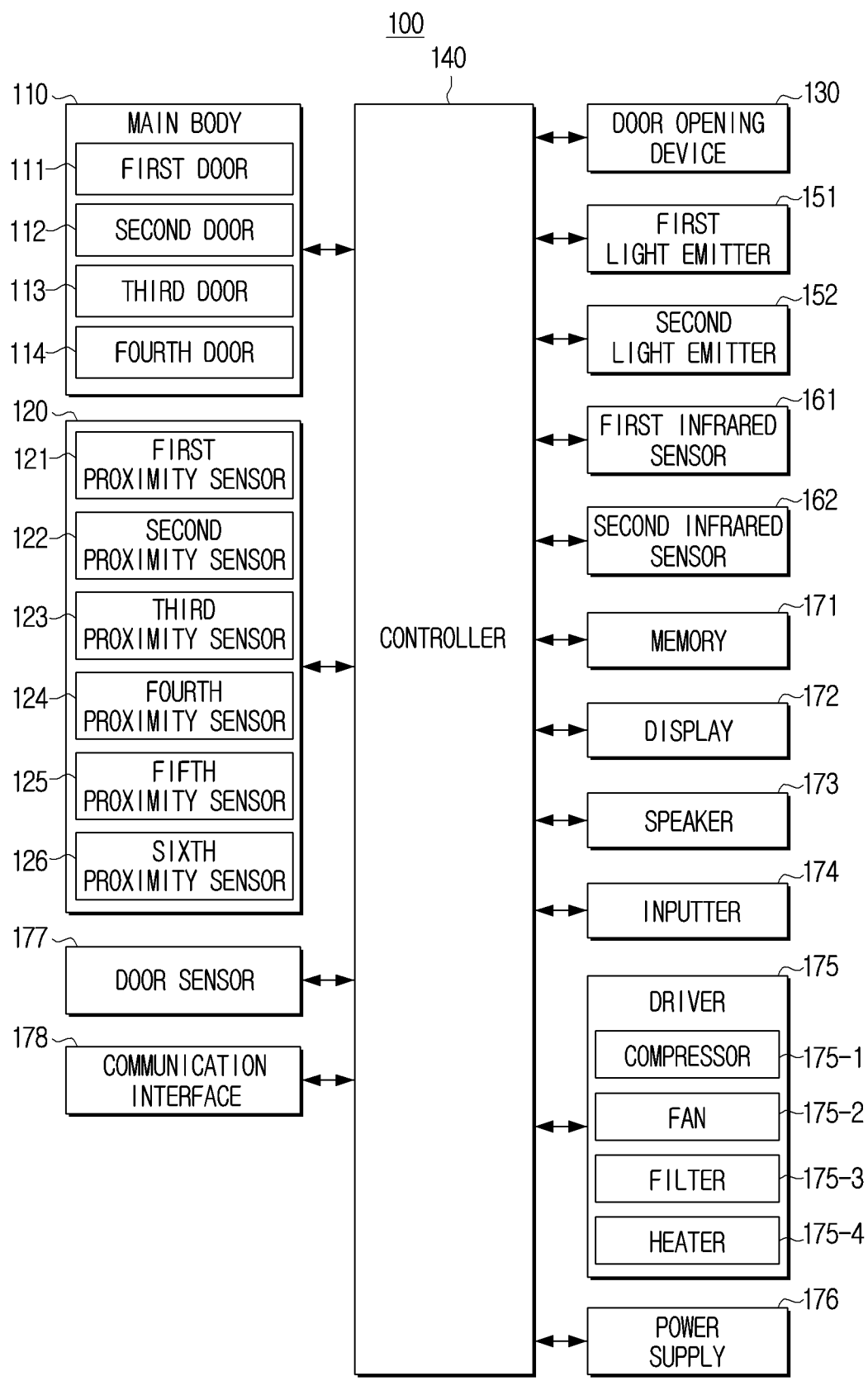
FIG. 2 is a block diagram illustrating a refrigerator of FIG. 21 according to an embodiment of the disclosure.

FIG. 2 is a block diagram of a refrigerator of FIG. 1 according to an embodiment of the disclosure.

Referring to FIG. 2, the refrigerator 100 may include the main body 110, the proximity sensor 120, the door opening device 130, the controller 140, the first light emitter 151, the second light emitter 152, a first infrared sensor 161, a second infrared sensor 162, a memory 171, a display 172, a speaker 173, an inputter 174, a driver 175, a power supply 176, a door sensor 177, a communication interface 178, and a memory 179.

The description of the same operations as described above among the operations of the first door 111, the first proximity sensor 121, the door opening device 130, the controller 140 and a first infrared sensor 161 will be omitted.

The main body 110 may include a first door 111, a second door 112, a third door 113, and a fourth door 114.

The proximity sensor 120 may include a first proximity sensor 121, a second proximity sensor 122, a third proximity sensor 123, a fourth proximity sensor 124, a fifth proximity sensor 125, and a sixth proximity sensor 126.

The first light emitter 151 and the second light emitter 152 may include a plurality of light emitting elements and may emit light.

The first infrared sensor 161 and the second infrared sensor 162 may refer to a sensor for outputting infrared rays, receiving infrared rays reflected by an object, and detecting a position of the object.

The memory 171 may be implemented as an internal memory, such as a read-only memory (ROM), such as electrically erasable programmable read-only memory (EEPROM), and a random-access memory (RAM) or a memory separate from the controller 140. In this case, the memory 171 may be implemented as at least one of a memory embedded within the refrigerator 100 or a memory detachable from the refrigerator 100 according to the usage of data storage. For example, the data for driving the refrigerator 100 may be stored in the memory embedded within the refrigerator 100, and the data for upscaling of the refrigerator 100 may be stored in the memory detachable from the refrigerator 100.

The display 172 may be implemented as a display of various types, such as a liquid crystal display (LCD), organic light emitting diodes (OLED) display, a plasma display panel (PDP), or the like. In the display 172, a backlight unit, a driving circuit which may be implemented as an a-si thin-film-transistor (TFT), low temperature poly silicon (LTPS) TFT, organic TFT (OTFT), or the like, may be included as well. In the meantime, the display 172 may be implemented as a touch screen coupled with a touch sensor, a flexible display, a third-dimensional (3D) display, or the like.

The speaker 173 may be configured to output various alarm sounds or voice messages as well as various audio data for which various processing operations are performed by an input/output interface.

The inputter 174 may receive various user inputs and deliver the user inputs to the controller 140. The inputter 174 may include a touch sensor, a (digital) pen sensor, a pressure sensor, a key, or the like. The touch sensor may use, for example, at least one of electrostatic, resistive, infrared, or ultrasonic methods. A (digital) pen sensor may, for example, be part of a touch panel or include a separate recognition sheet. The key may include, for example, a physical button, an optical key, or a keypad.

The driver 175 may further include a compressor 175-1 operating according to the control of the controller 140, the fan 175-2, the filter 175-3, or the heater 175-4. The driver 175 may further include lighting (not shown) or deodorizer (not shown).

The compressor 175-1 may compress the refrigerant, which is operating fluid of the refrigeration cycle, by the control of the controller 140. The freezing cycle may include a condenser (not shown) for converting the gaseous refrigerant compressed by the compressor 175-1 into a liquid refrigerant, an expander (not shown) for decompressing the liquid refrigerant, and an evaporator (not shown) for vaporizing the decompressed liquid refrigerant. The controller 140 may control the temperature of the storage chamber through vaporization of the refrigerant in the liquid state. In addition, the refrigerator may control the temperature of the storage chamber through a Peltier element (not shown) using a Peltier effect, and a magnetic cooling device (not shown) using a magnetocaloric effect.

The fan 175-2 may circulate outside air by the control of the controller 140. The air which gets hot by the cooling cycle may be heat-exchanged through the outside air and may be cooled.

The filter 175-3 may sterilize (or remove) germs which may float in or attached to a storage room by the control of the controller 140. The filter 175-3 may include an ion sterilizing purifier.

The heater 175-4 may remove frost which may be generated by the control of the controller 140. The heater 175-4 may include a defrosting heater.

The power supply 176 may supply power to the components of the refrigerator by the control of the controller 140. The power supply 176 may supply power input from an external power source to each component of the refrigerator through a power cord (not shown) under the control of the controller 140.

The door sensor 177 may be a sensor capable of identifying the opening or closing of a door attached to (included in) the refrigerator 100. The door sensor 177 may generate information corresponding to the opening or closing of the door, and the door sensor 177 may transmit the generated detection information to the controller 140. The door sensor 177 may detect whether the refrigerator door or the freezer door is opened or closed. The door sensor 177 may be implemented in a form that generates an event when a user opens a door and outputs data. The door sensor 177 may confirm contact of a physical configuration so as to identify whether the door is opened or closed.

The communication interface 178 is configured to communicate with various types of external devices according to various types of communication methods. The communication interface 178 may include a Wi-Fi module, a Bluetooth module, an infrared communication module, a wireless communication module, or the like. The Wi-Fi module and Bluetooth module may perform communication by Wi-Fi mode and Bluetooth mode, respectively. The wireless communication module may include at least one communication chip performing communication according to various communication standards, such as Zigbee, 3rd generation (3G), 3rd generation partnership project (3GPP), long term evolution (LTE), LTE advanced (LTE-A), 4th generation (4G), 5th generation (5G), or the like, in addition to the communication modes described above.

Figure 3:
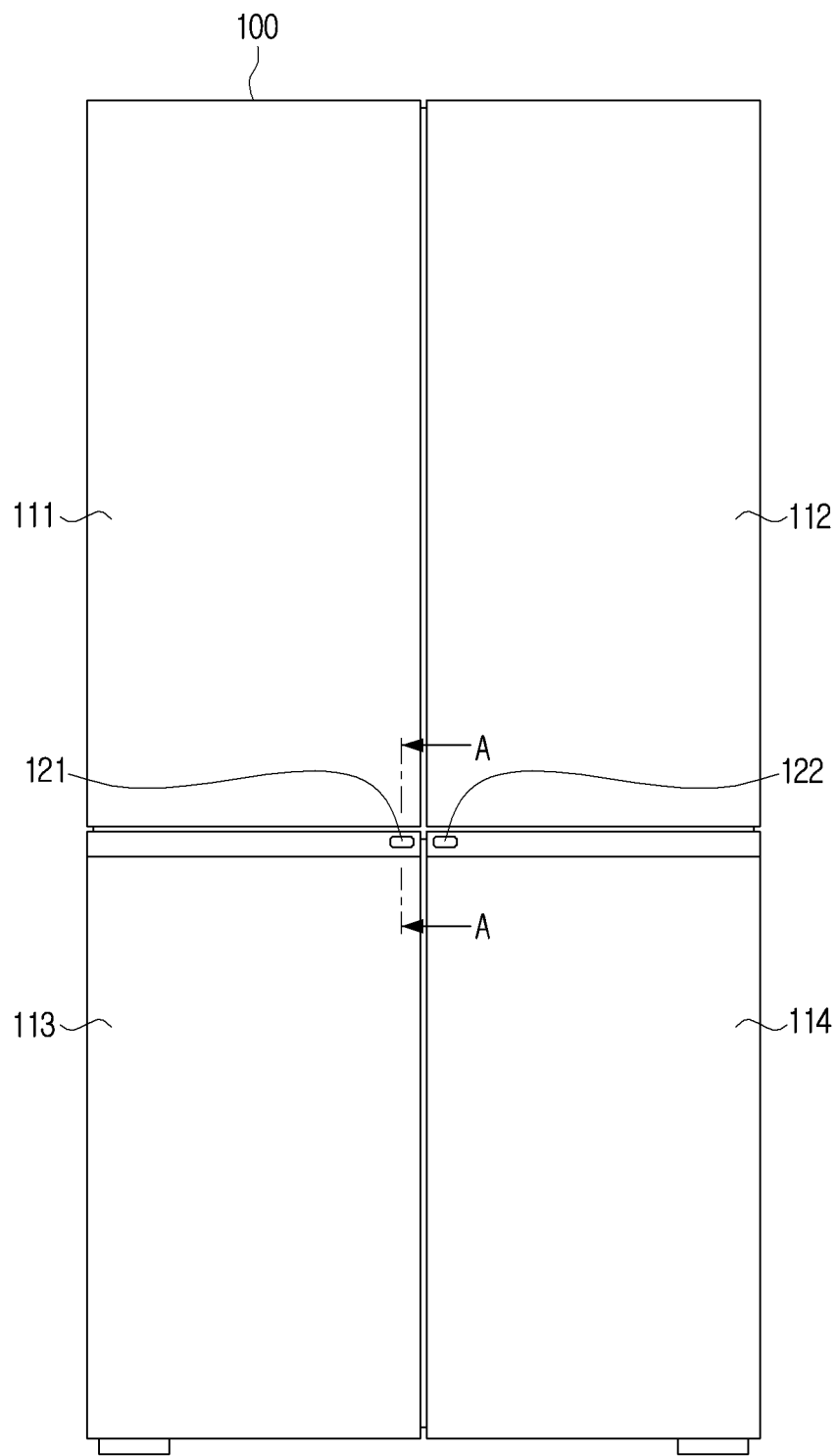
FIG. 3 is a front view illustrating a refrigerator according to an embodiment of the disclosure.

FIG. 3 is a front view of a refrigerator according to an embodiment of the disclosure.

Referring to FIG. 3, the refrigerator 100 may include the first door 111, the second door 112, the third door 113, the fourth door 114, the first proximity sensor 121 and the second proximity sensor 122.

According to an embodiment of the disclosure, the first proximity sensor 121 and the second proximity sensor 122 may be disposed on the lower doors (i.e., the third door 113 and the fourth door 114, respectively). Specifically, the first proximity sensor 121 may be disposed on the third door 113, and the second proximity sensor 122 may be disposed on the fourth door 114.

According to another embodiment of the disclosure, the first proximity sensor 121 and the second proximity sensor 122 may be disposed on a central portion of the body of the refrigerator. The central portion of the refrigerator body may mean a central bezel that may distinguish between the first door 111 and the second door 112, the third door 113 and the fourth door 114.

Specifically, the first proximity sensor 121 may be disposed on an upper right of the third door 113, and the second proximity sensor 122 may be disposed on an upper left of the fourth door 114.

The refrigerator 100 may obtain detection data using the first proximity sensor 121 and the second proximity sensor 122 and may perform a door opening operation based on the obtained detection data.

Figure 4A:
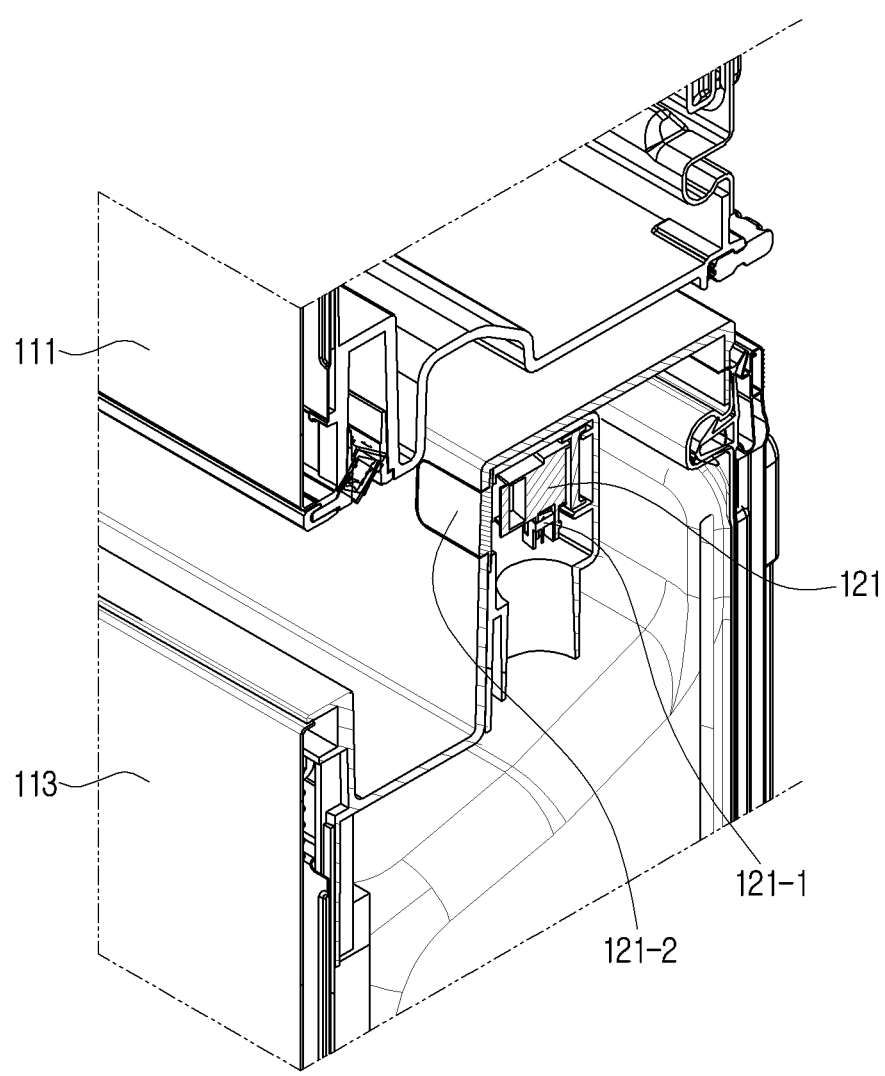
FIG. 4A is a perspective view as viewed from A-A direction of FIG. 3 according to an embodiment of the disclosure.

FIG. 4A is a perspective view in a direction of A-A of FIG. 3 according to an embodiment of the disclosure.

Referring to FIG. 4A, the first proximity sensor 121 may be disposed on an upper end of the third door 113. The first proximity sensor 121 may be disposed on the right side of the third door 113. The first proximity sensor 121 may be disposed to be not in contact with the lower portion of the first door 111. Meanwhile, the first proximity sensor 121 may be fixed to the third door 113 by a fixing member 121-1. More particularly, the fixing member 121-1 may be connected to the first door 111. A cover 121-2 of the first proximity sensor 121 may be matched to a front portion of the third door 113. Since the cover 121-2 of the first proximity sensor 121 may be made of a transparent material, the first proximity sensor 121 may sense it through the cover 121-2.

The second proximity sensor 122 may be disposed on the upper end of the fourth door 114. Specifically, the second proximity sensor 122 may be disposed on the left side of the upper end of the fourth door 114. The second proximity sensor 122 may be disposed to be not in contact with the lower portion of the second door 112. Meanwhile, the second proximity sensor may also be fixed by a fixing member (not shown) and sensed through a cover (not shown).

Figure 4B:
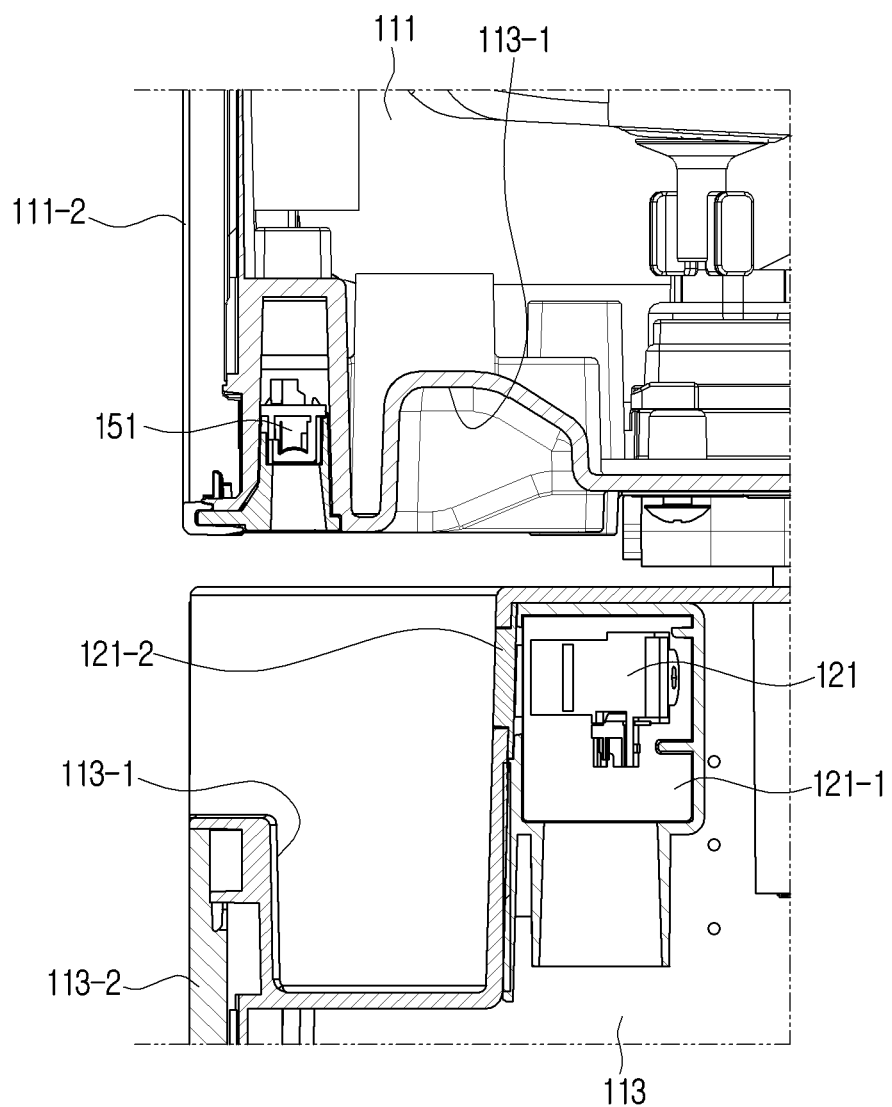
FIG. 4B is a side view as viewed from A-A direction of FIG. 3 according to an embodiment of the disclosure.

FIG. 4B is a side view as viewed from a direction A-A of FIG. 3 according to an embodiment of the disclosure.

Referring to FIG. 4B, the refrigerator 100 may include a first door 111 and a third door 113. The first door 111 may include a first handle 111-1, a first cover 111-2 and a first light emitter 151. Meanwhile, in FIG. 4B, only the first light emitter 151 is displayed, but in fact, the first infrared sensor 161 may be disposed together with the first light emitter.

More particularly, the first light emitter 151 may emit light in a downward direction of the first door 111. For example, the first light emitter 151 may emit light in a direction perpendicular to the bottom surface of the first door 111 (90-degree direction). As another example, the first light emitter 151 may emit light in a direction inclined to the bottom of the first door 111. (For example, the first light emitter 151 may emit light at an angle of 45 degrees to the bottom of the first door.) Meanwhile, the first infrared sensor 161 may be disposed at the same angle as the first light emitter. However, according to an implementation example, the first infrared sensor 161 may be disposed at a different angle from the first light emitter 151. For example, the first light emitter 151 may emit light in a direction inclined at 45 degrees to the bottom of the first door 111, and the first infrared sensor 161 may emit infrared rays in a direction perpendicular to the bottom surface of the first door 111.

Meanwhile, the third door 113 may include a third handle 113-1, a third cover 113-2, and a first proximity sensor 121.

The third handle 113-1 may refer to a portion that the user touches to open and close the third door 113. The third handle 113-1 may be disposed on the top of the third door 113.

The third cover 113-2 may be disposed in front of the third door 113 and may contact the third handle 113-1.

The first proximity sensor 121 may be disposed on the third door 113 by the fixing member 121-1. In addition, the first proximity sensor 121 may perform a detection operation through the cover 121-2. Specifically, the first proximity sensor 121 may emit light for detecting an object through the cover 121-2, and may receive light reflected by the object through the cover 121-2.

Figure 4C:
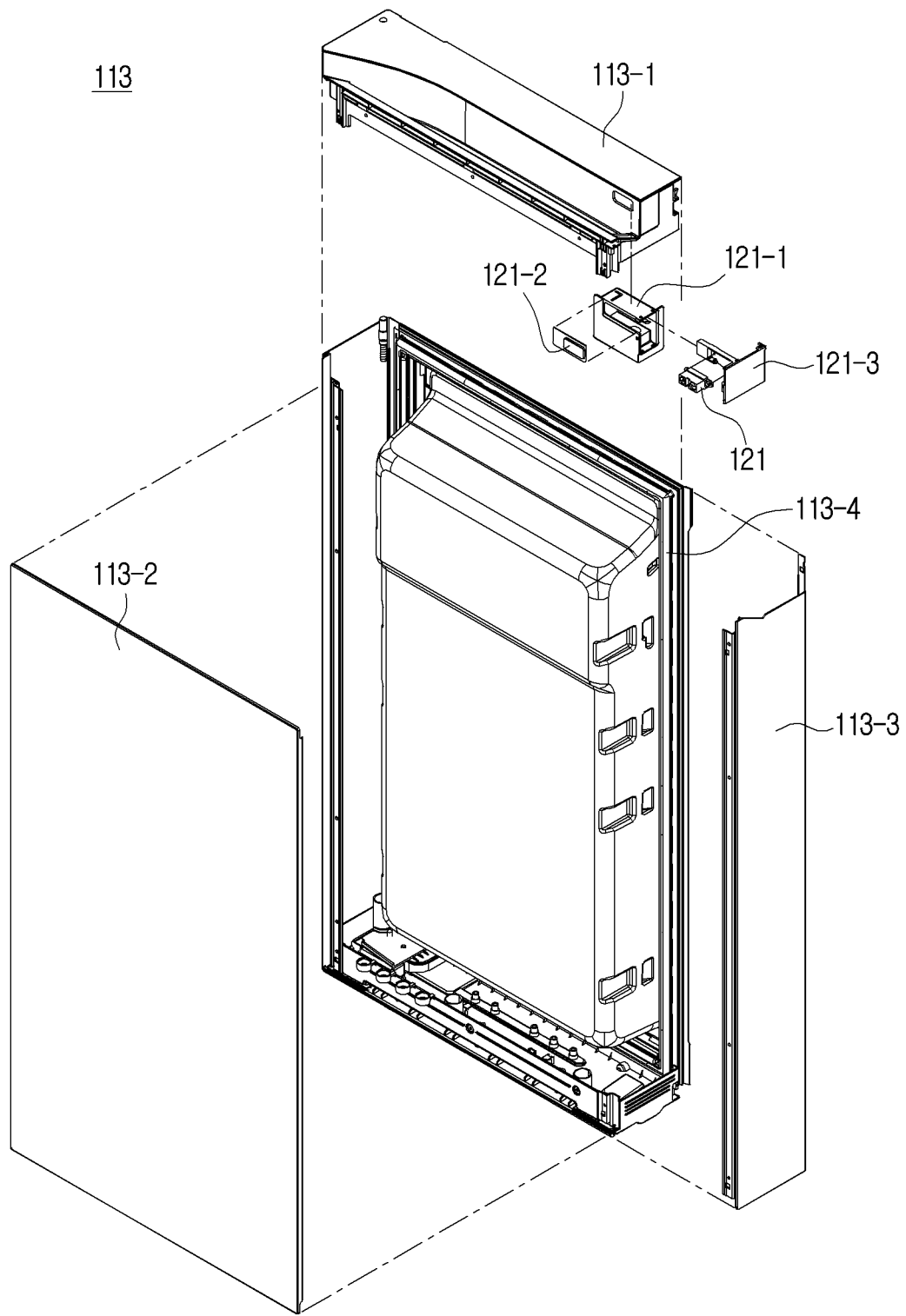
FIG. 4C is a perspective view of a third door according to an embodiment of the disclosure.

FIG. 4C is a perspective view of a third door according to an embodiment of the disclosure.

Referring to FIG. 4C, the third door 113 may include a third handle 113-1, a third cover 113-2, a side cover 113-3 of the third door, a body 113-4 of the third door, and a first proximity sensor 121. In addition, the first proximity sensor 121 may include a fixing member 121-1, a cover 121-2, and a side fixing member 121-3.

Since the third handle 113-1 and the third cover 113-2 have been described in FIG. 4B, redundant descriptions will be omitted. The third side cover 113-3 may mean a cover attached to the third handle 113-1, the side cover 113-2 of the third door, and the body 113-4 of the third door.

The body 113-4 of the third door may refer to a member including the basic configuration of the door.

Meanwhile, the fixing member 121-1 may be a member that is disposed in contact with the cover 121-2 and the side fixing member 121-3 to fix the first proximity sensor 121. Specifically, the cover 121-2 may be disposed in front of the fixing member 121-1, and the side fixing member 121-3 may be disposed on the side of the fixing member 121-1. In addition, the first proximity sensor 121 may directly contact and be fixed to the side fixing member 121-3.

Figure 5:
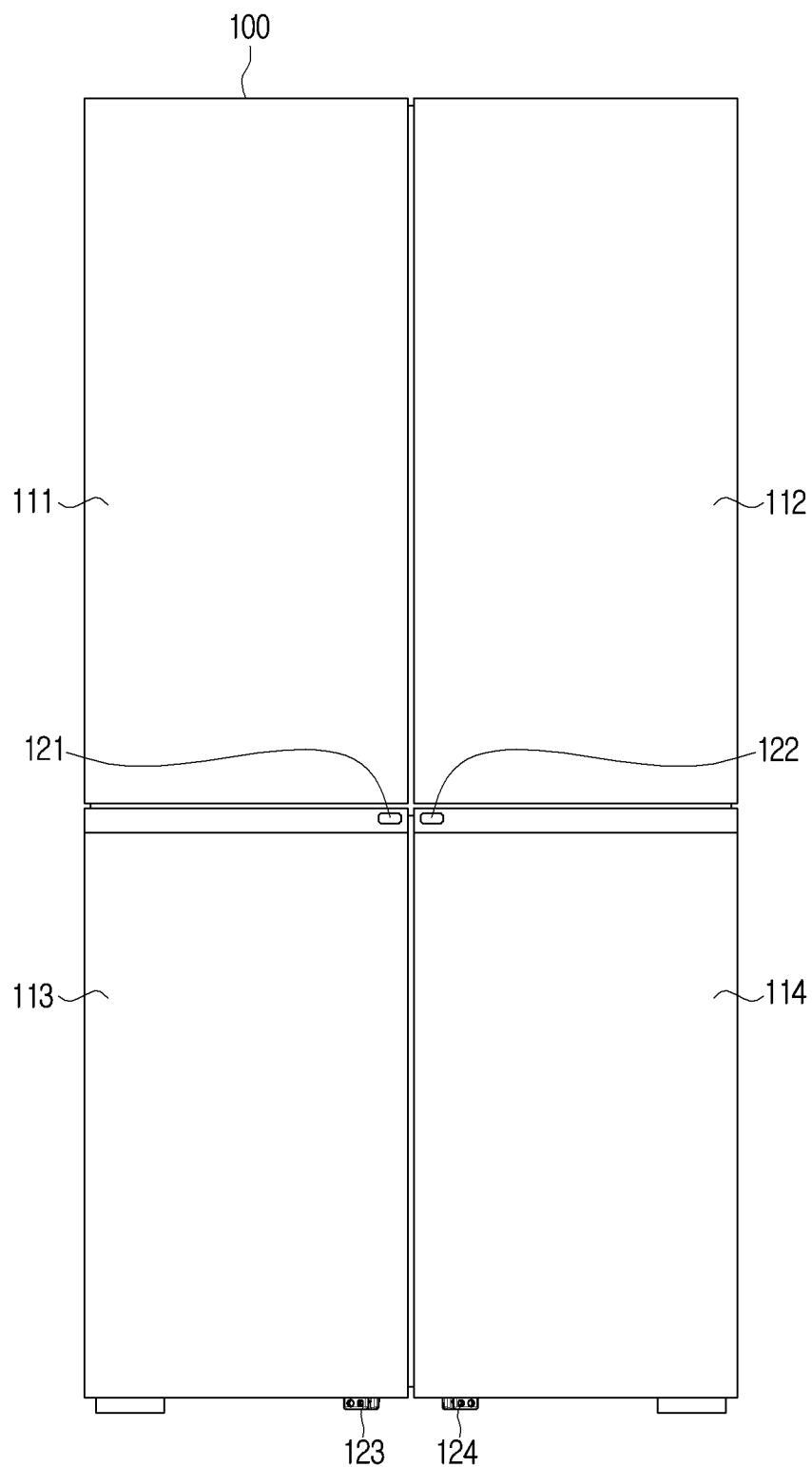
FIG. 5 is a front view illustrating a refrigerator according to an embodiment of the disclosure.

FIG. 5 is a front view illustrating a refrigerator according to an embodiment of the disclosure.

Referring to FIG. 5, the refrigerator 100 may include the first door 111, the second door 112, the third door 113, the fourth door 114, the first proximity sensor 121, the second proximity sensor 122, the third proximity sensor 123, and the fourth proximity sensor 124.

The first door 111, the second door 112, the third door 113, the fourth door 114, the first proximity sensor 121, and the second proximity sensor 122 have been described with reference to FIGS. 4A to 4C and will not be further described to avoid redundancy.

According to an embodiment of the disclosure, the third proximity sensor 123 and the fourth proximity sensor 124 may be disposed on the lower portion of the refrigerator 100. Specifically, the third proximity sensor 123 and the fourth proximity sensor 124 may be disposed on the lower portion of the refrigerator to sense an external object located on the front surface of the refrigerator 100.

The third proximity sensor 123 and the fourth proximity sensor 124 may have different detection directions facing the front surface of the refrigerator 100. Specifically, that the detection direction is different may mean that the arrangement angle of the sensor is different based on a plane parallel to the lower portion of the door.

Figure 6:
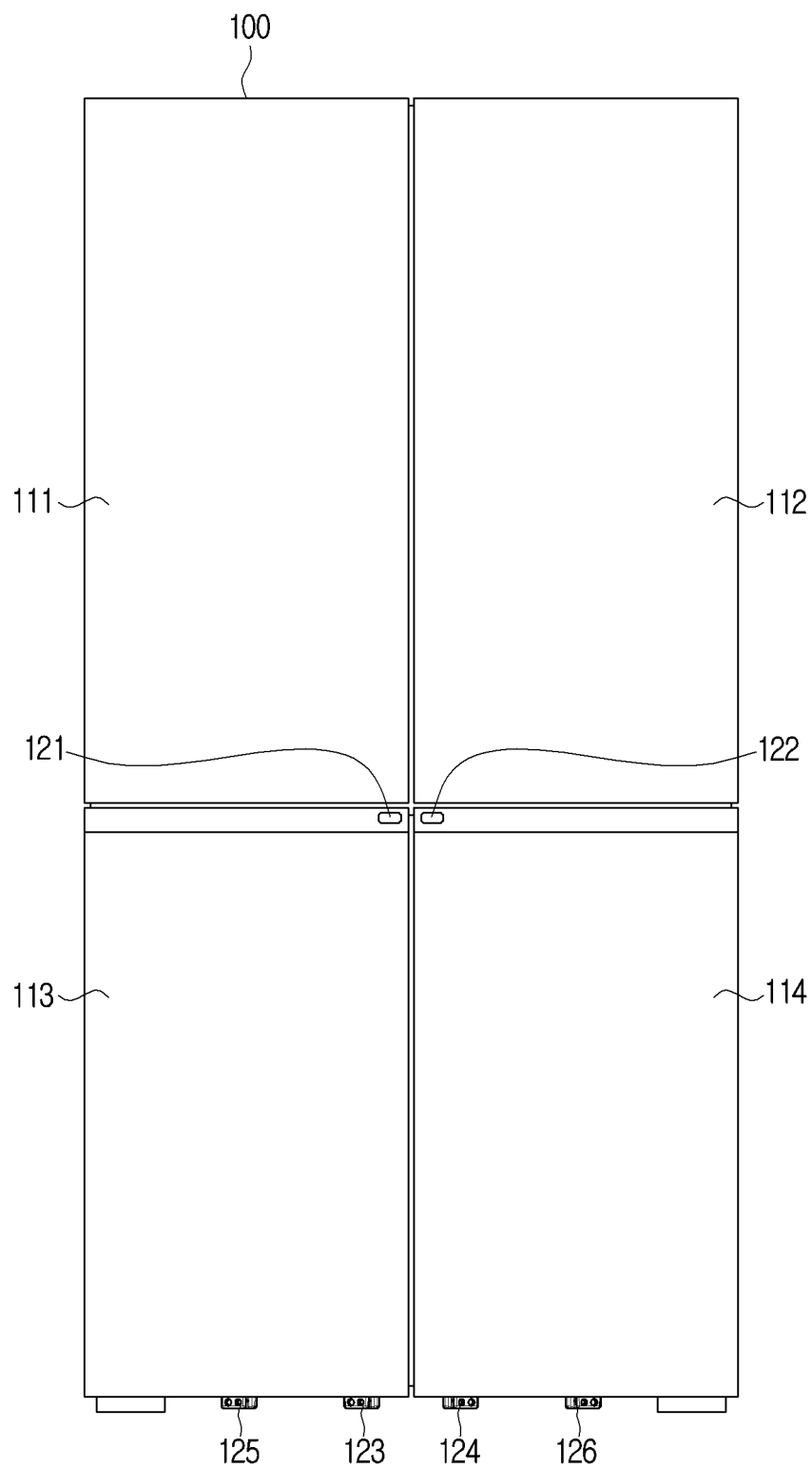
FIG. 6 is a front view illustrating a refrigerator according to an embodiment of the disclosure.

FIG. 6 is a front view of a refrigerator according to an embodiment of the disclosure.

Referring to FIG. 6, the refrigerator 100 may include the first door 111, the second door 112, the third door 113, the fourth door 114, the first proximity sensor 121, the second proximity sensor 122, the third proximity sensor 123, the fourth proximity sensor 124, a fifth proximity sensor 125, and a sixth proximity sensor 126.

The third proximity sensor 123 and the fifth proximity sensor 125 may be disposed on the third door 113, and the fourth proximity sensor 124 and the sixth proximity sensor 126 may be disposed in the fourth door 114. The third proximity sensor 123 and the fifth proximity sensor 125 may be disposed on the lower portion of the third door 113, and the fourth proximity sensor 124 and the sixth proximity sensor 126 may be disposed on the lower portion of the fourth door 114.

The first proximity sensor 121 may be disposed on an upper portion of the third door 113, and the second proximity sensor 122 may be disposed on an upper portion of the fourth door 114.

Figure 7:
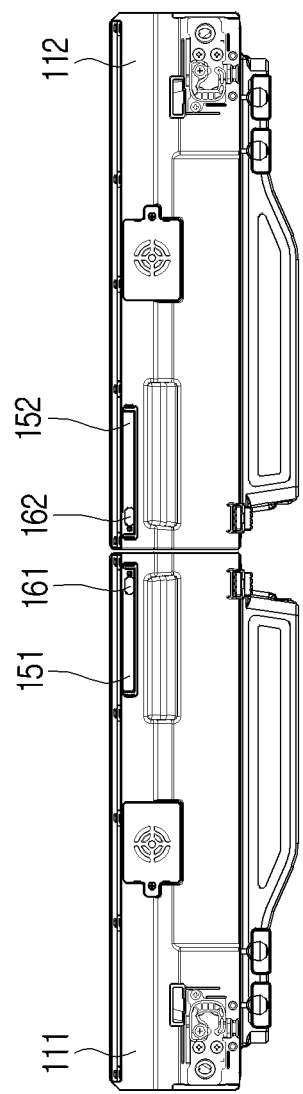
FIG. 7 is a bottom view illustrating a first door and a second door according to an embodiment of the disclosure.

FIG. 7 is a bottom view of a first door and a second door according to an embodiment of the disclosure.

Referring to FIG. 7, at least one of the first light emitter 151 and the first infrared sensor 161 may be disposed on the first door 111. In addition, at least one of the second light emitter 152 or the second infrared sensor 162 may be disposed on the second door 112.

Specifically, at least one of the first light emitter 151 and the first infrared sensor 161 may be disposed on the bottom of the first door 111. At least one of the first light emitter 151 or the first infrared sensor 161 may be disposed in a right edge area (left edge area toward the front of the refrigerator 100) of the bottom portion of the first door 111.

In addition, at least one of the second light emitter 152 and the second infrared sensor 162 may be disposed on the bottom of the second door 112. At least one of the second light emitter 152 or the second infrared sensor 162 may be disposed in the left edge area (the right edge area toward the front of the refrigerator 100) of the bottom portion of the second door 112.

Figure 8:
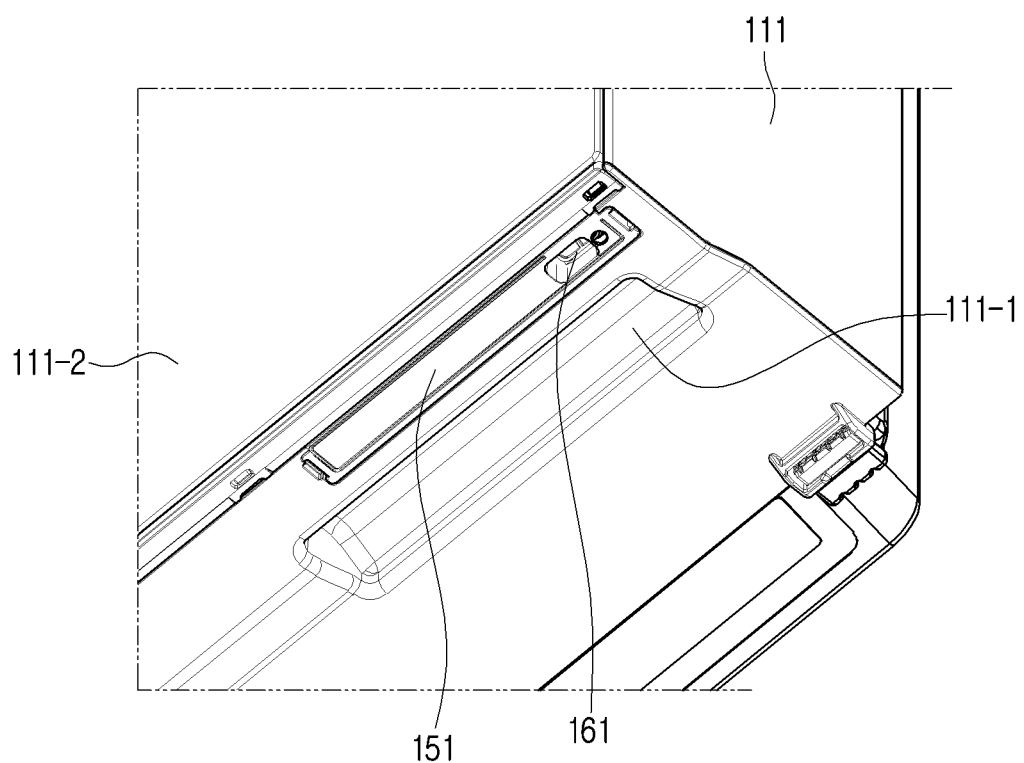
FIG. 8 is a perspective view illustrating a first door of FIG. 7 according to an embodiment of the disclosure.

FIG. 8 is a perspective view of a first door of FIG. 7 according to an embodiment of the disclosure.

Referring to FIG. 8, at least one of the first light emitter 151 and the first infrared sensor 161 may be disposed near the first handle 111-1 of the first door 111. The first infrared sensor 161 may be disposed such that the detection direction is downward. Specifically, at least one of the first light emitter 151 or the first infrared sensor 161 may be disposed between the first handle 111-1 of the first door 111 and the first cover 111-2 of the first door 111. When the first infrared sensor 161 is disposed between the first handle 111-1 of the first door 111 and the first cover 111-2 of the first door 111, the first infrared sensor 161 may detect a situation in which the user grabs the first handle 111-1 of the first door 111.

FIG. 9A is a perspective view of a first door of FIG. 8 according to an embodiment of the disclosure.

Referring to FIG. 9A, the first light emitter 151 may include a cover 151-1 of the first light emitter 151 and a plurality of light emitting diodes 151-2, 151-3, 151-4, and 151-5.

The plurality of light emitting diodes 151-2, 151-3, 151-4, and 151-5 may be disposed on a substrate 151-6 in which the first infrared sensor 161 is disposed, and the plurality of light emitting diodes 151-2, 151-3, 151-4, and 151-5 may be wrapped by a cover 151-1 of the first light emitter 151.

The plurality of light emitting diodes 151-2, 151-3, 151-4, and 151-5 may be disposed adjacent to the first infrared sensor 161 in a horizontal direction.

Figure 9B:
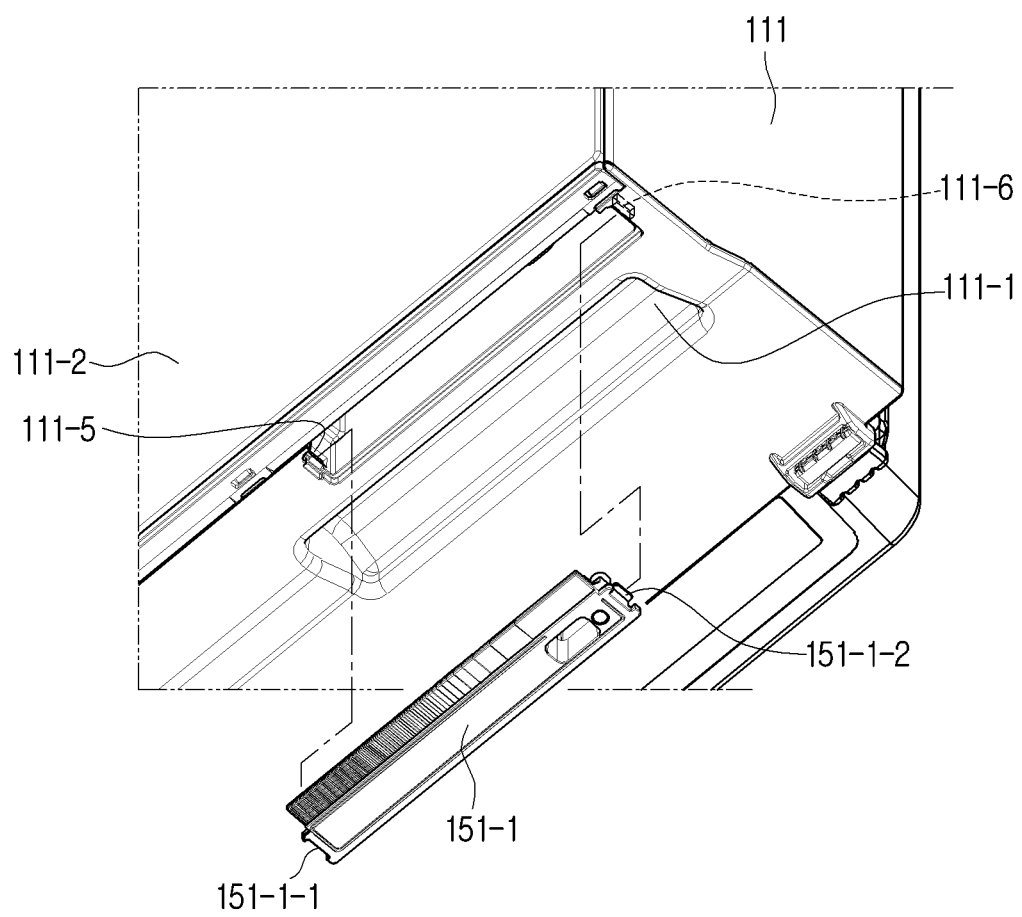
FIG. 9B is a perspective view illustrating a first door of FIG. 8 according to an embodiment of the disclosure.

FIG. 9B is a perspective view of a first door of FIG. 8 according to an embodiment of the disclosure.

Referring to FIG. 9B, the first door 111 may include the first handle 111-1 and the first cover 111-2, and the first light emitter 151 and the first infrared sensor 161 may be attached to the first door 111.

Figure 9C:
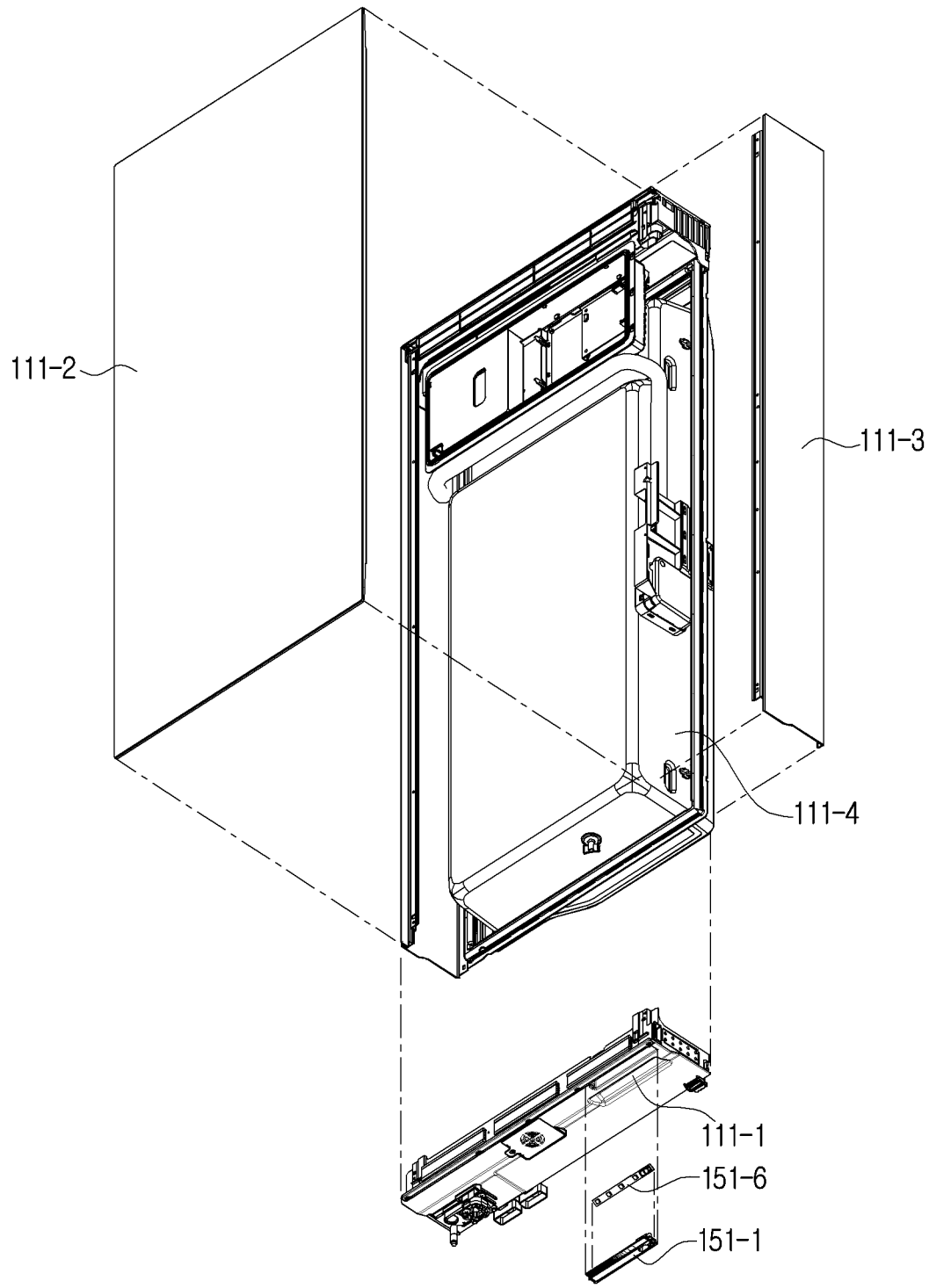
FIG. 9C is a perspective view illustrating a first door according to an embodiment of the disclosure.

The portion indicated by the first door 111 in FIG. 9B may correspond to the side cover 111-3 in FIG. 9C. In addition, in FIG. 9B, only the cover 151-1 of the first light emitter 151 is shown, but both the first light emitter 151 and the first infrared sensor 161 may be included.

The cover 151-1 of the first light emitter 151 may include a left connection member 151-1-1 and a right connection member 151-1-2. In addition, the first door 111 may include a connection member 111-5 connected to the left connection member 151-1-1 and a connection member 111-6 connected to the right connection member 151-1-2. Accordingly, the left connection member 151-1-1 of the first light emitter cover 151-1 may contact with the connection member 111-5 of the first door 111, and the right connection member 151-1-2 of the first light emitter cover 151-1 1 may contact with the connection member 111-6 of the first door 111.

FIG. 9C is a perspective view of first door according to an embodiment of the disclosure.

Referring to FIG. 9C, the first door 111 may include the first handle 111-1, the first cover 111-2, the side cover 111-3 of the first door, and a main body 110 of the first door. Further, the cover 151-1 of the first light emitter and a substrate 151-6 of the first light emitter may be disposed on the first door 111.

The first handle 111-1 may be disposed at a lower right of the first door 111, and the first cover 111-2 may be disposed in front of the first door 111, and the side cover 111-3 of the first door may be disposed on the side of the first door 111, and the body 111-4 of the first door may refer to a configuration of being surrounded by the first cover 111-2 and the side cover of the first door 111-3.

FIG. 10A is a bottom view and a front view of a substrate on which a plurality of light emitting diodes 151-2, 151-3, 151-4, and 151-5 and a first infrared sensor 161 are disposed together according to an embodiment of the disclosure.

Referring to FIG. 10A, a plurality of light emitting diodes 151-2, 151-3, 151-4, and 151-5 may be disposed on a substrate 151-6 at regular intervals, and the first infrared sensor 161 may be disposed in the right area of the plurality of light emitting diodes 151-2, 151-3, 151-4, and 151-5 based on the bottom view and the front view.

The second infrared sensor 162 may be disposed in the right area of the plurality of light emitting diodes based on the front view and the bottom view.

Figure 10B:
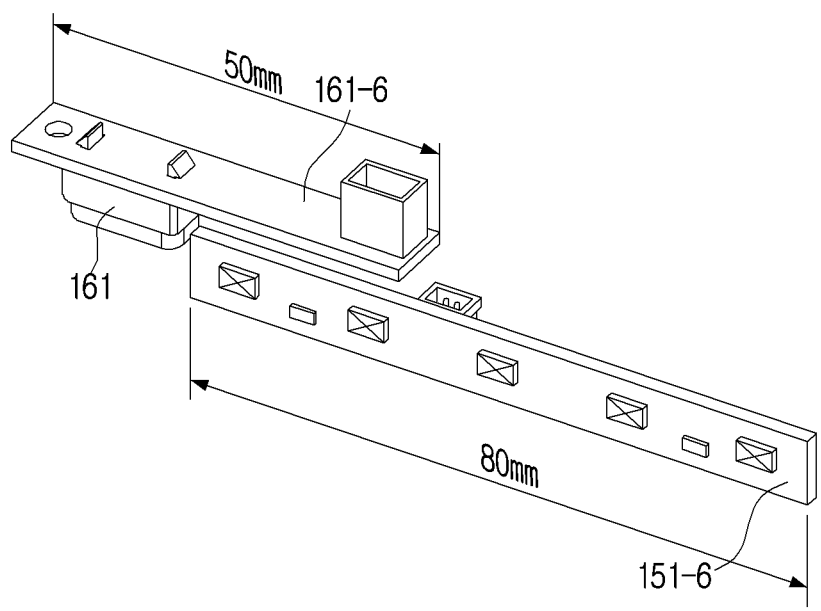
FIG. 10B is a perspective view illustrating a light emitter and an infrared sensor according to an embodiment of the disclosure.

FIG. 10B is a perspective view illustrating a light emitter and an infrared sensor according to an embodiment of the disclosure.

Referring to FIG. 10B, the first light emitter 151 and the first infrared sensor 161 may be disposed on separate substrates. For example, the first light emitter 151 may be disposed on the light emitting substrate 151-6. In addition, the first infrared sensor 161 may be disposed on the infrared sensor substrate 161-6.

In the description of FIG. 10A described above, it has been described that the first infrared sensor 161 is disposed on the light emitting substrate 151-6 to be configured as one module. However, in the embodiment of FIG. 10B, the first light emitter 151 and the first infrared sensor 161 may be disposed as separate substrates, respectively. In addition, the first light emitter 151 and the first infrared sensor 161 may contact each other to form a single module, and the module including the first light emitter 151 and the first infrared sensor 161 may be disposed on the first door 111.

Meanwhile, the light emitting substrate 151-6 may include a plurality of light emitting diodes (not shown). In addition, the light emitting diode may emit light toward the lower end of the first door 111. However, according to implementation examples, light may be emitted toward the front of the first door 111.

In addition, the light emitting substrate 151-6 may be disposed at a different angle from the infrared sensor substrate 161-6. For example, the light emitting substrate 151-6 is disposed in an inclined state with respect to the bottom surface of the first door 111, but the infrared sensor substrate 161-6 may be placed in parallel.

Figure 10C:
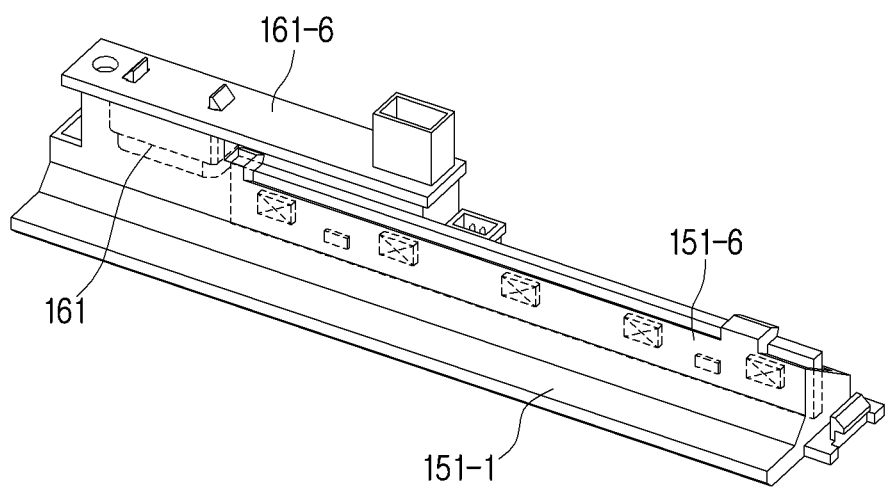
FIG. 10C is a perspective view illustrating of FIG. 10B according to an embodiment of the disclosure.

FIG. 10C is a perspective view illustrating an embodiment of FIG. 10B according to an embodiment of the disclosure.

Referring to FIG. 10C, one module including the first light emitter 151 and the first infrared sensor 161 may contact the cover 151-1. The cover 151-1 may be disposed on the bottom of the first door 111. The cover 151-1 may be made of a transparent material, such that light emitted from the first light emitter 151 may pass through the cover 151-1. In addition, the first infrared sensor 161 may detect an object through the cover 151-1. For example, infrared rays emitted by the first infrared sensor 161 may be emitted outside the refrigerator through the cover 151-1, and infrared rays reflected by an object may also pass through the cover 151-1 and reach to the first infrared sensor 161.

Figure 11:
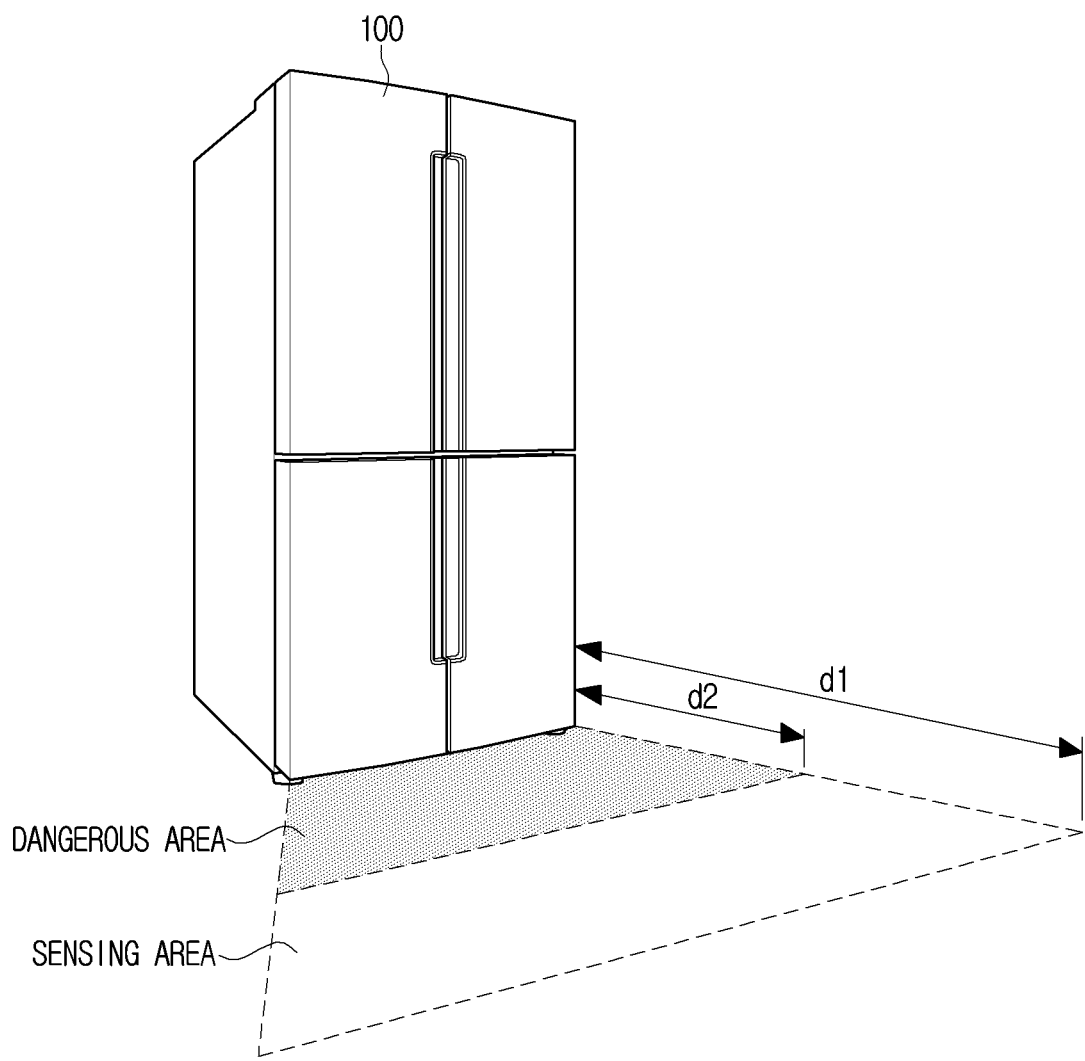
FIG. 11 is a view illustrating a detection area of a refrigerator according to an embodiment of the disclosure.

FIG. 11 is a diagram illustrating a detection area of a refrigerator according to an embodiment of the disclosure.

Referring to FIG. 11, the refrigerator 100 may detect whether the external object is identified in the predetermined area based on detection data obtained through the proximity sensor. The predetermined area may vary depending on the user's setting.

According to an embodiment of the disclosure, the refrigerator 100 may identify an area corresponding to an area between a distance d1 from the refrigerator 100 to a first threshold distance and a distance d2 from the refrigerator 100 to a second threshold distance as a detection area. The refrigerator 100 may identify an area corresponding to a distance d2 from the refrigerator 100 to a second threshold distance as a dangerous area. The dangerous area may be a product liability area. The product liability area may refer to an area where a user using a manufactured product may be damaged during an essential operation of a manufactured product.

According to another embodiment of the disclosure, the refrigerator 100 may identify the distance d1 from the refrigerator 100 to a first threshold distance as a detection area, and identify an area corresponding to a distance d2 from the refrigerator 100 to a second threshold distance as a dangerous area.

The difference between the embodiment and another embodiment may be about which area is set as the detection area. In one embodiment of the disclosure, the dangerous area does not correspond to the detection area, but in other embodiments of the disclosure, the dangerous area may be included in the detection area. If it is assumed that a person has approached a dangerous area directly, in an embodiment of the disclosure, an external object may be identified as not approaching, and in other embodiments the external object may be identified as approaching.

Figure 12:
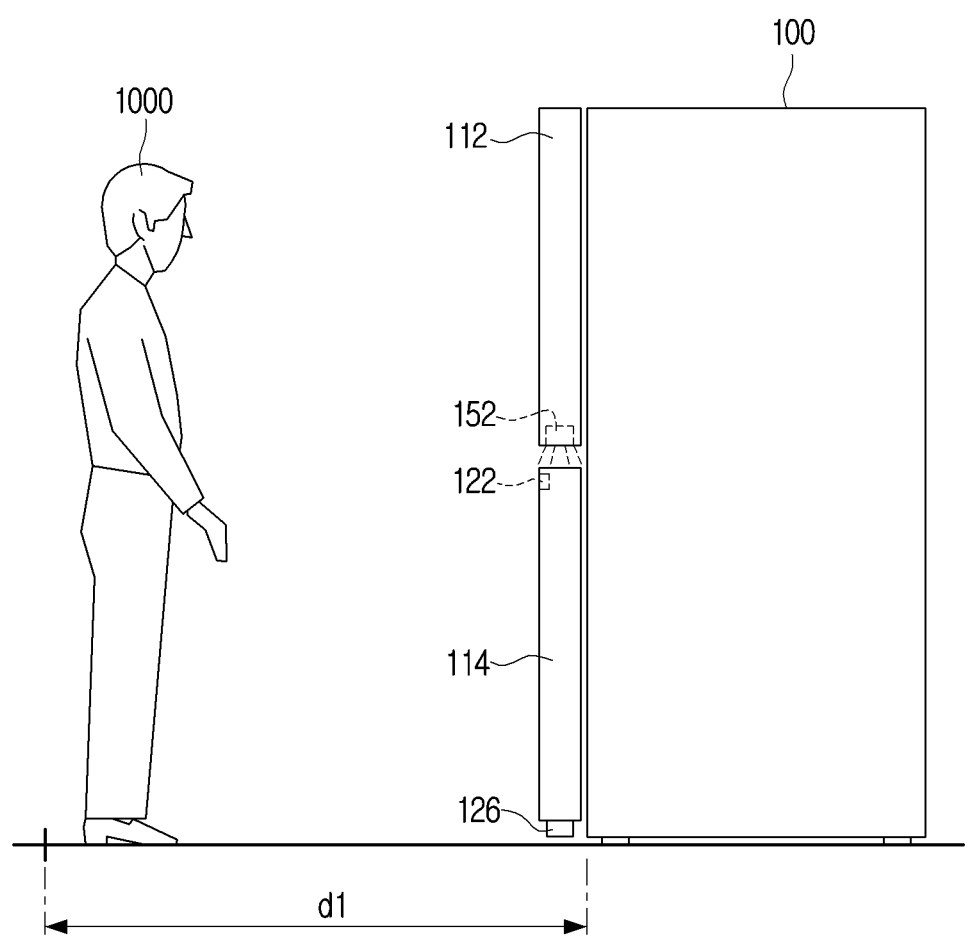
FIG. 12 is a view illustrating a door opening operation of a refrigerator according to an embodiment of the disclosure.

FIG. 12 is a diagram illustrating a door opening operation of a refrigerator according to an embodiment of the disclosure.

Referring to FIG. 12, the refrigerator 100 may further include a first light emitter 151 and a second light emitter 152.

The refrigerator 100 may identify whether an external object exists in the detection area. The detection region may be divided into an upper detection area and a lower detection area. The upper detection area may refer to area identifiable by the first proximity sensor 121 and the second proximity sensor 122. The lower detection area may refer to an area identifiable by the third proximity sensor 123 to the sixth proximity sensor 126.

It is assumed that the detection area is from the refrigerator 100 to the threshold distance d1. The refrigerator 100 may identify whether an external object 1000 exists in a detection area based on detection data obtained from at least one of the first proximity sensor 121 to the sixth proximity sensor 126. When the external object 1000 exists in the detection area, the refrigerator 100 may control the first light emitter 151 and the second light emitter 152 to operate in the first light emitting mode. The first light emitting mode may be a mode (or a mode of turning on the light emitter) that emits light with the same illuminance.

In a state where light is not output through the light emitter, light is output in a first light emitting mode, the user may easily recognize that the door opening has not been performed.

Figure 13:
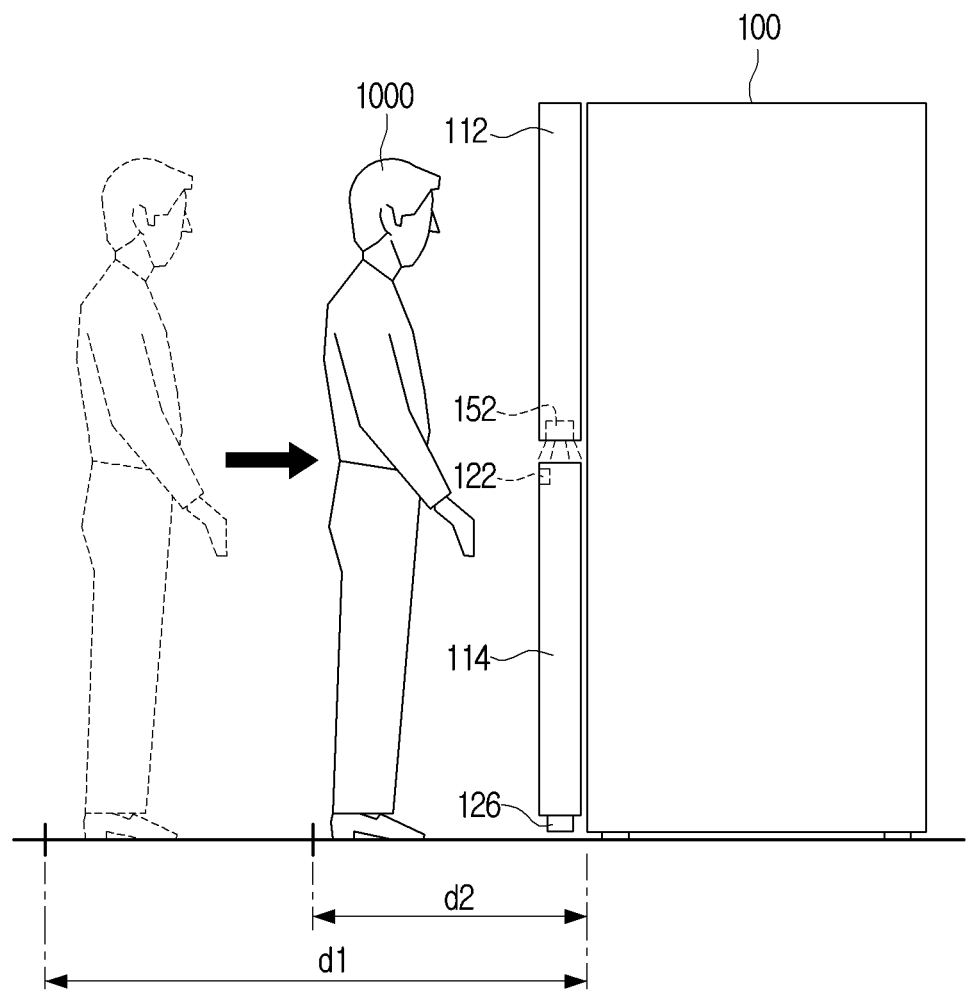
FIG. 13 is a view illustrating a subsequent operation of a door opening operation of FIG. 12 according to an embodiment of the disclosure.

FIG. 13 is a diagram illustrating a subsequent operation of a door opening operation of FIG. 12 according to an embodiment of the disclosure.

Referring to FIG. 13, the refrigerator 100 may identify that the external object 1000 exists in a detection area and may control the first light emitter 151 and the second light emitter 152 to operate in the first light emitting mode, and then, based on detection data obtained from at least one of the first proximity sensor 121 to the sixth proximity sensor 126, the refrigerator 100 may identify whether the external object 1000 exists in the dangerous area.

The dangerous area may be divided into an upper dangerous area and a lower dangerous area. The upper dangerous area may refer to an area detectable by the first proximity sensor 121 and the second proximity sensor 122, and the lower dangerous area may refer to an area detectable by the third proximity sensor 123 to the sixth proximity sensor 126.

The dangerous area may be an area from the refrigerator 100 to the threshold distance d2. If the external object 1000 exists in the dangerous area, the refrigerator 100 may control the at least one light emitter so that at least one light emitter of the first light emitter 151 or the second light emitter 152 operates in the second light emitting mode. The second light emitting mode may be in a light emitting mode.

As light may be output in a second light emitting mode which is different from the first light emitting mode, the user may easily recognize that the automatic door opening has not been performed.

Figure 14:
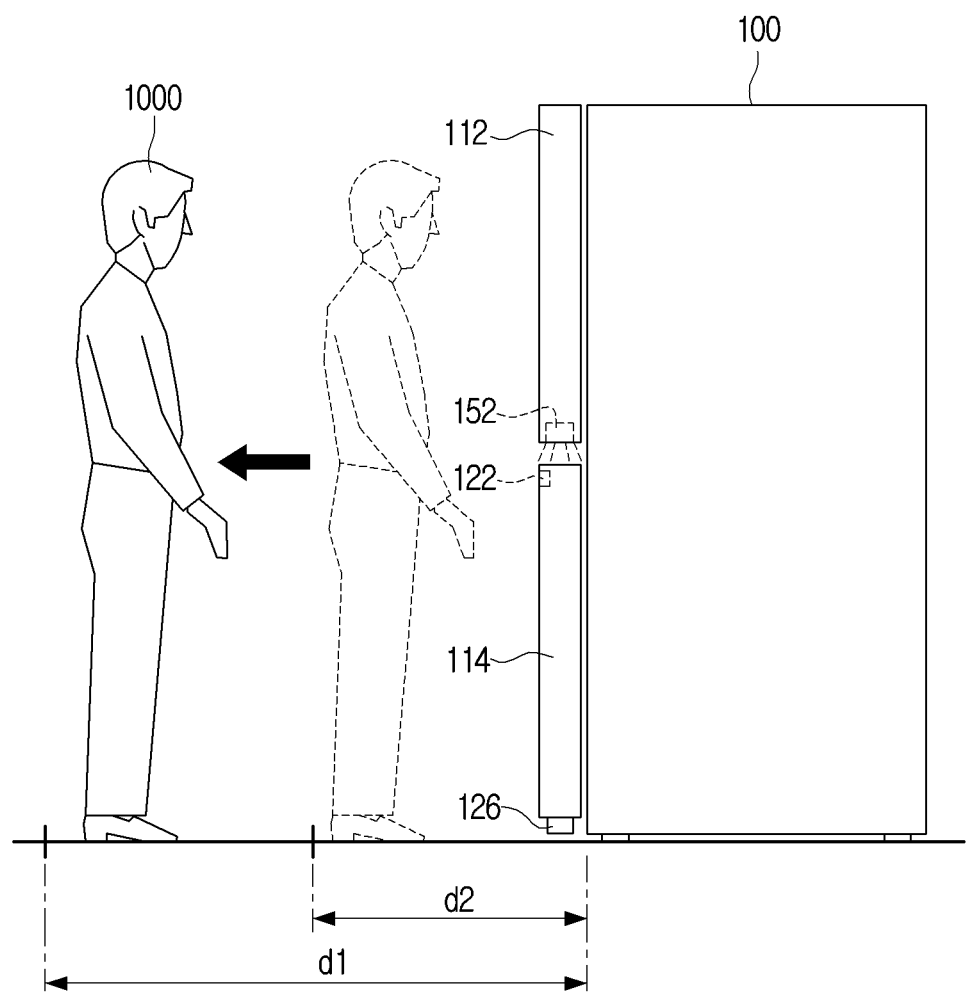
FIG. 14 is a view illustrating a subsequent operation of a door opening operation of FIG. 13 according to an embodiment of the disclosure.

FIG. 14 is a diagram illustrating a subsequent operation of a door opening operation of FIG. 13 according to an embodiment of the disclosure.

Referring to FIG. 14, when the external object 1000 is identified in the dangerous area after the external object 1000 has been identified in the detection area, the refrigerator 100 may identify whether the external object 1000 exists in the dangerous area again. If the external object 1000 does not exist in the dangerous area, the refrigerator 100 may control at least one of the first door 111 or the second door 112 to be opened.

Figure 15:
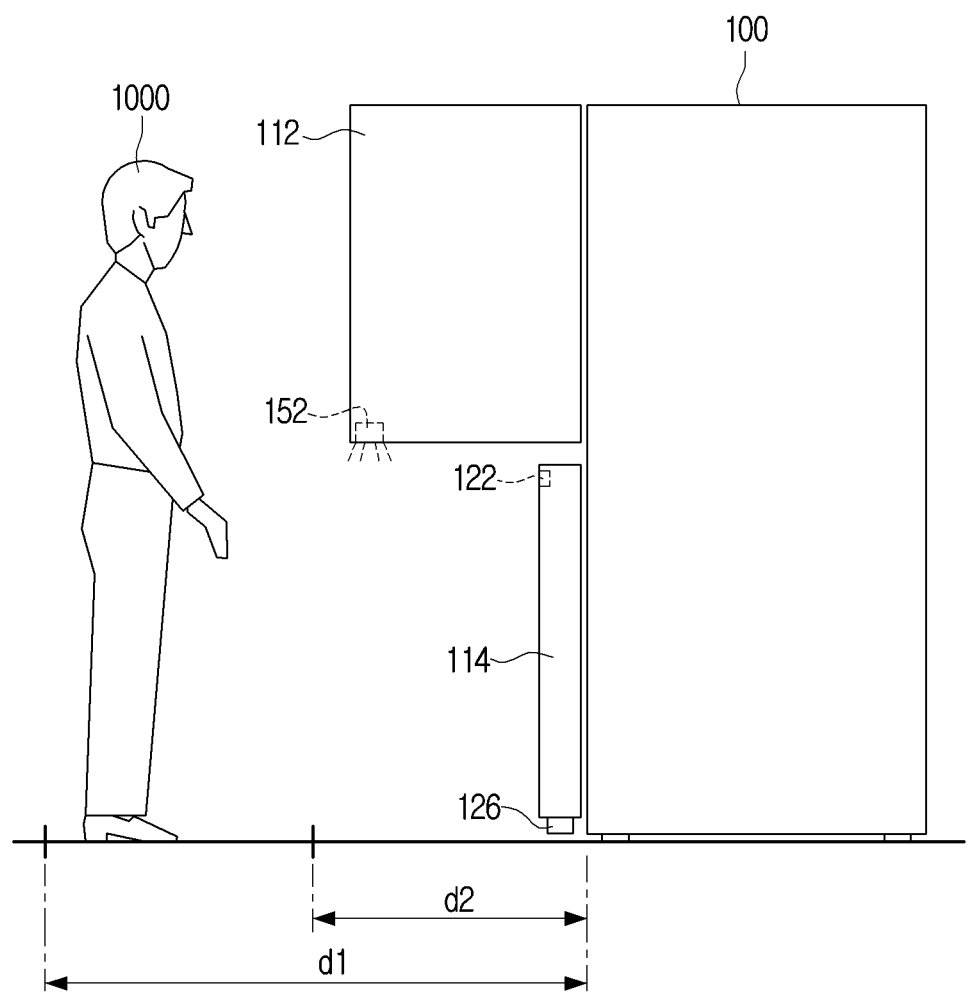
FIG. 15 is a view illustrating a subsequent operation of a door opening operation of FIG. 14 according to an embodiment of the disclosure.

FIG. 15 is a diagram illustrating a subsequent operation of a door opening operation of FIG. 14 according to an embodiment of the disclosure.

Referring to FIG. 15, the refrigerator 100 may control at least one of the first door 111 or the second door 112 to be automatically opened based on a predetermined event. The predetermined event may refer to an event that the external object 1000 is identified in the detection area, and the external object 1000 is identified in the dangerous area after the external object 1000 is identified in the detection area, and the external object 1000 is not identified in the dangerous area after the external object 1000 is identified in the dangerous area. That the external object 1000 is not identified in the dangerous area after the external object 1000 has been identified in the dangerous area may mean that the external object 1000 approaches and then away from the refrigerator 100.

The refrigerator 100 may control the door opening device 130 to automatically open at least one of the first door 111 or the second door 112 based on the predetermined event.

The refrigerator 100 may control at least one light emitter such that at least one light emitter of the first light emitter 151 or the second light emitter 152 operates in the third light emitting mode from the second light emitting mode again based on a predetermined event.

The third light emitting mode may refer to a mode different from the first light emitting mode and the second light emitting mode. For example, the third light emitting mode may be a mode where light having a color different from the first light emitting mode may be output at a predetermined illuminance while outputting light with a predetermined illuminance, such as the first light emitting mode. As another example, the third light emitting mode may be a mode in which light may be output at a different speed than the second light emitting mode while outputting the light to be flicking, such as the second light emitting mode.

As the light may be output in the third light emitting mode different from the first light emitting mode and the second light emitting mode, the user may easily recognize that the operation of automatically opening the door of the refrigerator 100 has been performed.

Figure 16:
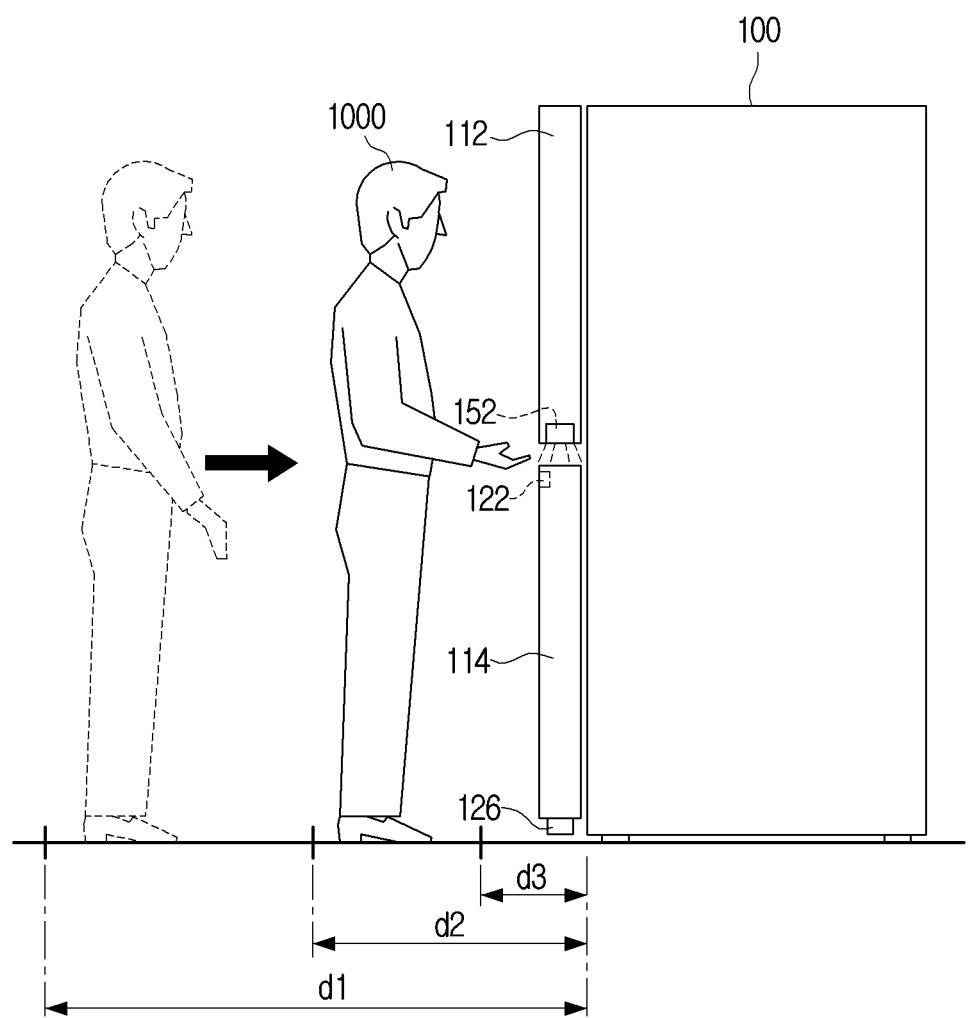
FIG. 16 is a view illustrating a door opening operation of a refrigerator according to an embodiment of the disclosure.

FIG. 16 is a diagram illustrating a door opening operation of a refrigerator according to an embodiment of the disclosure.

Referring to FIG. 16, the refrigerator 100 may control the door to be automatically opened based on the predetermined event.

The predetermined event may be made of three operations.

As the first operation, the refrigerator 100 may determine whether the external object 1000 is identified in the detection area (area from the refrigerator 100 to d1).

In the second operation, when the external object 1000 is identified in the detection area, the refrigerator 100 may determine whether the external object 1000 is identified in a trigger area. The trigger area may mean a region from the refrigerator 100 to the d3. In general, if the user performs an action of extending the hand or foot, the proximity sensor may recognize the action and identify that the external object 1000 is present in the trigger area.

In the third operation, the refrigerator 100 may determine whether the external object 1000 is not identified in the trigger area when the external object 1000 is identified in the trigger area. If the external object 1000 is identified in the trigger area, the refrigerator 100 may determine that the door is not opened. When the external object 1000 is identified in the trigger area and then the external object 1000 is not identified in the trigger area, the refrigerator 100 may control the door opening device 130 to automatically open at least one of the first door 111 or the second door 112.

In determining whether the external object 1000 is identified in the trigger area, the refrigerator 100 may use at least one sensor of the first proximity sensor 121 or the second proximity sensor 122, and the first proximity sensor 121 and the second proximity sensor 122 may be disposed above a predetermined threshold height. The refrigerator 100 may determine whether the external object 1000 is identified in the trigger area by using only one sensor of the first proximity sensor 121 or the second proximity sensor 122 without using the third proximity sensor 123 to the sixth proximity sensor 126 with respect to the final event for automatic door opening.

In a situation where the door is automatically opened based on a predetermined event, the refrigerator 100 may determine whether the external object 1000 is identified in the dangerous area. When the external object 1000 is identified in the dangerous area when the door is automatically opened, the refrigerator 100 may control the door opening device 130 to stop opening the door. When the automatic opening operation is not recognized by the user and when the user is located near the refrigerator 100, the user may be protected by automatically stopping the opening operation.

Figure 17:
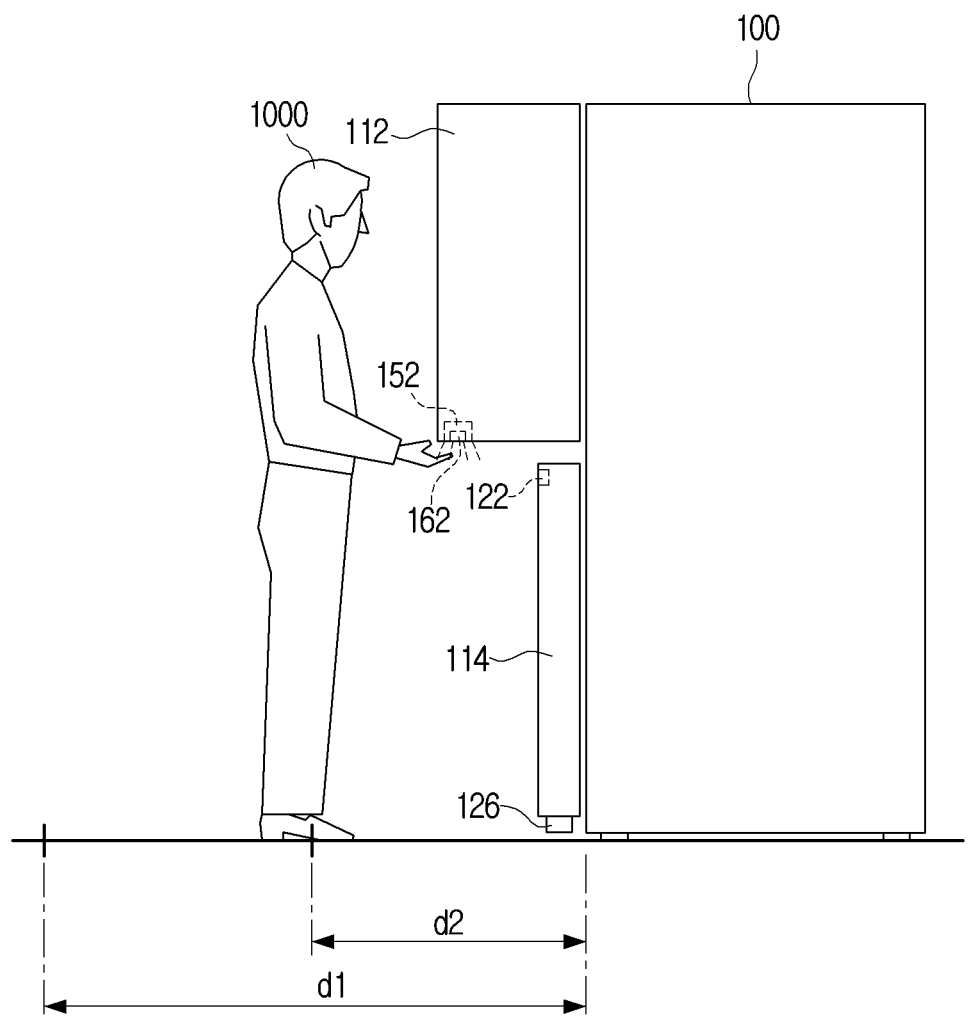
FIG. 17 is a view illustrating a control operation of a refrigerator according to an embodiment of the disclosure.

FIG. 17 is a diagram illustrating a control operation of a refrigerator according to an embodiment of the disclosure.

Referring to FIG. 17, the refrigerator 100 may control the door opening device 130 to automatically open at least one of the first door 111 or the second door 112 based on the predetermined event.

The second light emitter 152 and the second infrared sensor 162 may be disposed on the second door 112. When the external object 1000 is sensed through the second infrared sensor 162, the refrigerator 100 may control the door opening device 130 so that the second door 112 is not opened.

Similarly, the first light emitter 151 and the first infrared sensor 161 may be disposed on the first door 111. When the external object 1000 is sensed through the first infrared sensor 161, the refrigerator 100 may control the door opening device 130 so that the first door 111 is not opened.

The embodiment may be applied to the operation of opening at least one of the first door 111 or the second door 112 by the control of the refrigerator 100. For example, when the external object 1000 is sensed through the second infrared sensor 162 while the second door 112 is opened based on a predetermined event, the refrigerator 100 may control the door opening device 130 so that the second door 112 is not opened.

The situation where the infrared sensor detects the external object 1000 may refer to a situation where the external object 1000 stretches the hand to grab a handle (knob) of a door or pushes the hand near the handle (knob).

Figure 18:
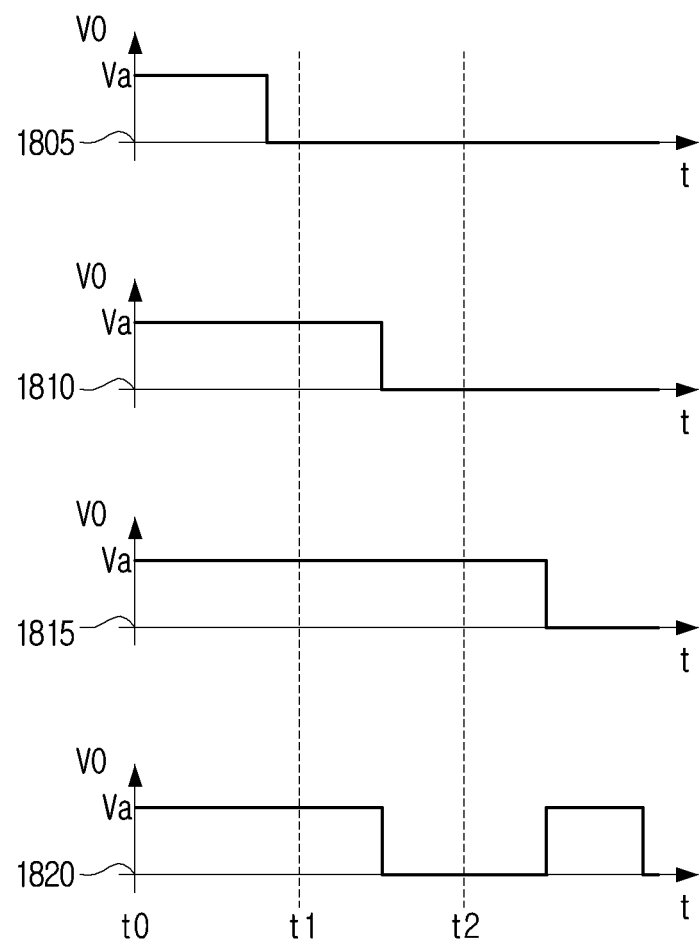
FIG. 18 is a view illustrating a control operation of a refrigerator according to an embodiment of the disclosure.

FIG. 18 is a diagram illustrating a control operation of a refrigerator according to an embodiment of the disclosure.

Referring to FIG. 18, the proximity sensor may have various detection values depending on whether an external object approaches or not. Here, the criteria of detection are assumed as voltage V0. When external object is sensed, Va value may be output, and when the external object is not sensed a value of 0 may be output.

According to an embodiment 1805 of the disclosure, the external object may not be sensed at the time point t0 by the proximity sensor and no longer sensed prior to t1. The refrigerator 100 may control the door opening device 130 so as not to open the door.

According to another embodiment 1810 of the disclosure, an external object may be sensed at a time point t0 by the proximity sensor and no longer sensed prior to t2 time point after t1. The refrigerator 100 may control the door opening device 130 to open the door.

According to another embodiment 1815 of the disclosure, an external object may be sensed at a time point t0 by the proximity sensor and no longer sensed after the t2 time point. The refrigerator 100 may control the door opening device 130 so as not to open the door.

According to another embodiment 1820 of the disclosure, an external object may be sensed at a time point t0 by the proximity sensor and no longer sensed prior to a t2 time point after a t1 time point, and an external object may be sensed again after the t2 time point. The refrigerator 100 may control the door opening device 130 to open the door, and stop the opening of the door which is being opened when the external object is sensed again after the t2 time point.

Figure 19:
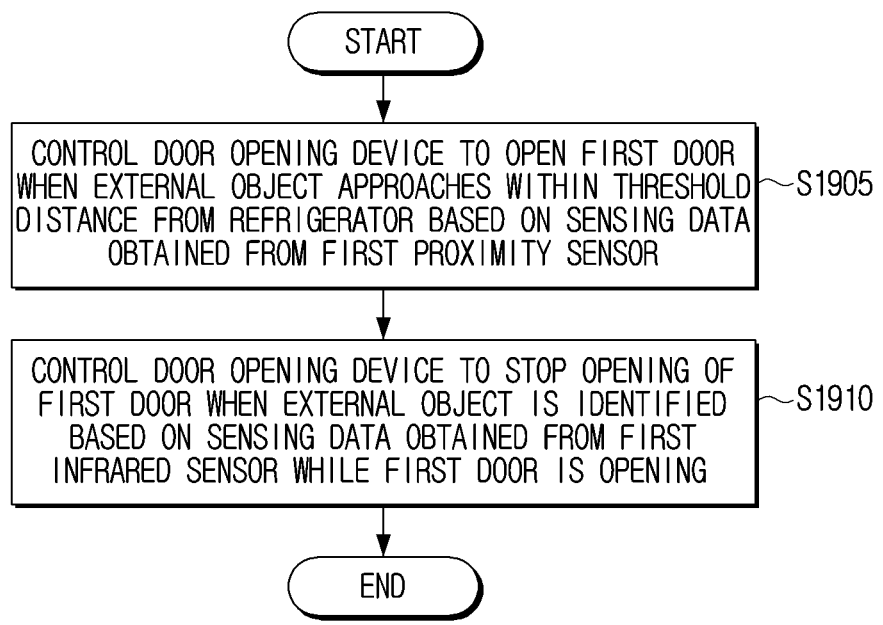
FIG. 19 is a flowchart illustrating a method for controlling a refrigerator according to an embodiment of the disclosure.

FIG. 19 is a flowchart illustrating a method of controlling a refrigerator according to an embodiment of the disclosure.

Referring to FIG. 19, a method for controlling the refrigerator 100 including a main body including a first door 111, a door opening device 130 for opening the first door 111, and a first proximity sensor 121 disposed adjacent to the first door 111, the first infrared sensor 161 disposed on the first door 111 may control the door opening device 130 to open the first door 111 when an external object approaches within a threshold distance from the refrigerator based on the detection data acquired from the first proximity sensor 121 at operation S1905.

In addition, the method for controlling the refrigerator 100 may control the door opening device when an external object is identified based on the detection data acquired by the first infrared sensor 161 while the first door 111 is open, to stop opening the first door at operation S1910.

The first door 111 may include a first cover disposed outside the first door 111 and a first handle formed inside the first cover, and the first infrared sensor 161 may be disposed between the first cover and the first handle.

The first handle may be disposed on the bottom of the first door 111, and the first infrared sensor 161 may be disposed on the bottom of the first door 111 to transmit infrared rays downward of the first door 111.

In addition, the first door 111 may include a first light emitter 151 disposed adjacent to the first infrared sensor 161, and may further include controlling the first light emitter 151 based on detection data obtained from the first proximity sensor 121.

More particularly, the controlling the first light emitter 151 may identify an approach distance of an external object based on the detection data obtained from the first proximity sensor 121, and control differently the light emitting mode of the first light emitter 151 based on the identified approach distance.

The controlling the first light emitter 151 may turn on the first light emitter when the approach distance of the external object is within the first threshold distance, and turn off the first light emitter 151 when the approach distance of the external object is smaller (or shorter) a second threshold which is smaller (or shorter) than the first threshold distance.

In addition, the first door 111 may include a first cover disposed outside the first door 111 and a first handle formed inside the first cover, and the first infrared sensor 161 may be disposed between the cover and the first handle, and the first infrared sensor 161 and the first light emitter 151 may be included in a first module disposed parallel to the first handle.

In addition, the refrigerator 100 may further include a second door 112 disposed adjacent to the first door 111 in a horizontal direction, a second proximity sensor 122 disposed adjacent to the second door 112, and the second infrared sensor 162 disposed on the second door 112, and the control method of the refrigerator 100 may include identifying a door close to an external object that has approached within a threshold distance from the refrigerator based on detection data obtained from the first proximity sensor 121 and the second proximity sensor 122, controlling the door opening device 130 to open the identified door among the first door 111 and the second door 112, and when an external object is identified by an infrared sensor disposed on the identified door while the identified door is being opened, controlling the door opening device 130 to stop opening the identified door.

The first door 111 may include a first cover disposed outside the first door 111 and a first handle formed inside the first cover, and the second door 112 may include a second cover disposed outside the second door 112 and a second handle formed inside the second cover, and the first infrared sensor 161 may be disposed between the first cover and the first handle, and the second infrared sensor 162 may be disposed between the second cover and the second handle.

The first infrared sensor 161 disposed on the first door 111 may be disposed adjacent to the second door 112, and the second infrared sensor 162 disposed on the second door 112 may be disposed adjacent to the first door 111.

Meanwhile, the method for controlling the refrigerator 100 as illustrated in FIG. 19 may be executed on the refrigerator 100 having the configuration of FIG. 1 or 2, and may also be executed on the refrigerator 100 having other configurations.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

According to an embodiment of the disclosure, the various embodiments described above may be implemented as software including instructions stored in a machine-readable storage media which is readable by a machine (e.g., a computer). The device may include the electronic device according to embodiments of the disclosure, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment of the disclosure, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media, such as a manufacturer's server, the application store's server, or a memory in a relay server.

According to embodiments of the disclosure, the respective elements (e.g., module or program) of the elements mentioned above may include a single entity or a plurality of entities. According to embodiments of the disclosure, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. Operations performed by a module, a program module, or other component, according to various embodiments of the disclosure, may be sequential, parallel, or both, executed iteratively or heuristically, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:
   a main body including a first door;
   a door opening device including a module for opening the first door;
   a first proximity sensor disposed adjacent to the first door;
   a first infrared sensor disposed on the first door; and
   at least one processor,
   wherein the at least one processor is configured to:
   based on detection data obtained by the first proximity sensor, transmit to the door opening device a signal for opening the first door according to an external object approaching within a threshold distance from the refrigerator, and
   based on the external object being identified according to detection data obtained by the first infrared sensor while the first door is open, transmit to the door opening device a signal for stopping the opening of the first door.

2. The refrigerator of claim 1,
   wherein the first door is configured to include a first cover disposed outside the first door and a first handle formed inside the first cover, and
   wherein the first infrared sensor is configured to be disposed between the first cover and the first handle.

3. The refrigerator of claim 2,
   wherein the first handle is configured to be disposed below the first door, and wherein the first infrared sensor is further configured to be disposed below the first door to irradiate infrared rays downward of the first door.

4. The refrigerator of claim 1,
wherein the first door includes a first light emitter disposed adjacent to the first infrared sensor, the first light emitter including at least one light emitting element, and
wherein the at least one processor is further configured to, based on the detection data obtained by the first proximity sensor, transmit a signal for turning on the first light emitter.

5. The refrigerator of claim 4, wherein the at least one processor is further configured to:
based on the detection data obtained by the first proximity sensor, identify an approach distance of the external object; and
based on the identified approach distance, transmit a signal for turning on a different light emitting mode of the first light emitter.

6. The refrigerator of claim 5, wherein the at least one processor is further configured to:
turn on the first light emitter based on the approach distance of the external object being within a first threshold distance; and
turn off the first light emitter based on the approach distance of the external object being within a second threshold distance smaller than the first threshold distance.

7. The refrigerator of claim 4,
wherein the first door is configured to include the first cover disposed outside the first door and the first handle formed inside the first cover,
wherein the first infrared sensor is configured to be disposed between the first cover and the first handle, and
wherein the first infrared sensor and the first light emitter are configured to be included in a first module disposed parallel to the first handle.

8. The refrigerator of claim 1, further comprising:
a second door disposed adjacent to the first door in a horizontal direction;
a second proximity sensor disposed adjacent to the second door; and
a second infrared sensor disposed on the second door,
wherein the at least one processor is further configured to:
based on detection data obtained by the first proximity sensor and the second proximity sensor, identify a door close to an external object that approaches within a threshold distance from the refrigerator,
transmit the door opening device a signal for opening the identified door among the first door and the second door, and
based on the external object being identified by the infrared sensor disposed on the identified door while the identified door is open, transmit to the door opening device a signal for stopping the opening of the identified door.

9. The refrigerator of claim 8,
wherein the first door is configured to include the first cover disposed outside the first door and the first handle formed inside the first cover,
wherein the second door is configured to include a second cover disposed outside the second door and a second handle formed inside the second cover,
wherein the first infrared sensor is configured to be disposed between the first cover and the first handle, and
wherein the second infrared sensor is configured to be dispose between the second cover and the second handle.

10. The refrigerator of claim 9,
wherein the first infrared sensor disposed on the first door is further configured to be disposed adjacent to the second door, and
wherein the second infrared sensor disposed on the second door is further configured to be disposed adjacent to the first door.

11. A method for controlling a refrigerator including a main body including a first door, a door opening device including a module for opening the first door, a first proximity sensor disposed adjacent to the first door, and a first infrared sensor disposed on the first door, the method comprising:
based on detection data obtained by the first proximity sensor, transmitting to the door opening device a signal for opening the first door according to an external object approaching within a threshold distance from the refrigerator; and
based on the external object being identified according to detection data obtained by the first infrared sensor while the first door is open, transmitting to the door opening device to stop a signal for stopping the opening of the first door.

12. The method of claim 11,
wherein the first door is configured to include a first cover disposed outside the first door and a first handle formed inside the first cover, and
wherein the first infrared sensor is configured to be disposed between the first cover and the first handle.

13. The method of claim 12,
wherein the first handle is configured to be disposed below the first door, and
wherein the first infrared sensor is further configured to be disposed below the first door to irradiate infrared rays downward of the first door.

14. The method of claim 11,
wherein the first door comprises a first light emitter disposed adjacent to the first infrared sensor, the first light emitter including at least one light emitting element, and
further comprising:
transmitting a signal for turning on the first light emitter based on the detection data obtained by the first proximity sensor.

15. The method of claim 14, wherein the transmitting a signal for turning on the first light emitter comprises:
based on the detection data obtained by the first proximity sensor, identifying an approach distance of the external object; and
based on the identified approach distance, transmitting a signal for turning on a different light emitting mode of the first light emitter.

16. The method of claim 15, wherein the transmitting a signal for turning on the first light emitter comprises:
transmitting a signal for turning on the first light emitter based on the approach distance of the external object being within a first threshold distance; and
transmitting a signal for turning off the first light emitter based on the approach distance of the external object being within a second threshold distance smaller than the first threshold distance.

17. The method of claim 14,
wherein the first door is configured to include the first cover disposed outside the first door and the first handle formed inside the first cover,
wherein the first infrared sensor is configured to be disposed between the first cover and the first handle, and
wherein the first infrared sensor and the first light emitter are configured to be included in a first module disposed parallel to the first handle.

18. The method of claim 11, wherein the refrigerator further comprises:
   a second door disposed adjacent to the first door in a horizontal direction;
   a second proximity sensor disposed adjacent to the second door; and
   a second infrared sensor disposed on the second door,
      based on detection data obtained by the first proximity sensor and the second proximity sensor, identifying a door close to an external object that approaches within a threshold distance from the refrigerator,
      transmitting a signal to the door opening device for opening the identified door among the first door and the second door, and
      based on the external object being identified by the infrared sensor disposed on the identified door while the identified door is open, transmitting a signal to the door opening device for stopping the opening of the identified door.

19. The method of claim 18,
wherein the first door is configured to include the first cover disposed outside the first door and the first handle formed inside the first cover,
wherein the second door is configured to include a second cover disposed outside the second door and a second handle formed inside the second cover,
wherein the first infrared sensor is configured to be disposed between the first cover and the first handle, and
wherein the second infrared sensor is configured to be dispose between the second cover and the second handle.

20. The method of claim 19,
wherein the first infrared sensor disposed on the first door is further configured to be disposed adjacent to the second door, and
wherein the second infrared sensor disposed on the second door is further configured to be disposed adjacent to the first door.

\* \* \* \* \*